US011136079B2

(12) United States Patent
D'Souza et al.

(10) Patent No.: US 11,136,079 B2
(45) Date of Patent: Oct. 5, 2021

(54) METHODS AND SYSTEMS FOR ASSEMBLING A VEHICLE

(71) Applicant: Honda Motor Co., Ltd., Tokyo (JP)

(72) Inventors: Clement D'Souza, Raymond, OH (US);
Jerry Herring, Raymond, OH (US);
Sandip Suvedi, Raymond, OH (US);
Emily Burton, Ostrander, OH (US);
Benjamin Fulton, Dublin, OH (US);
Jeffrey Britton, Richwood, OH (US);
Nahshon Harrell, Deleware, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 174 days.

(21) Appl. No.: 16/342,895

(22) PCT Filed: Oct. 16, 2017

(86) PCT No.: PCT/US2017/056798
§ 371 (c)(1),
(2) Date: Apr. 17, 2019

(87) PCT Pub. No.: WO2018/075405
PCT Pub. Date: Apr. 26, 2018

(65) Prior Publication Data
US 2019/0241225 A1 Aug. 8, 2019

Related U.S. Application Data

(60) Provisional application No. 62/409,117, filed on Oct. 17, 2016.

(51) Int. Cl.
*B62D 65/02* (2006.01)
*B62D 65/06* (2006.01)

(52) U.S. Cl.
CPC .......... *B62D 65/026* (2013.01); *B62D 65/06* (2013.01)

(58) Field of Classification Search
CPC .............................. B62D 65/026; B62D 65/06
See application file for complete search history.

(56) References Cited

U.S. PATENT DOCUMENTS 3,541,668 A * 11/1970 Schauld ................. B62D 23/00
29/469
5,018,781 A * 5/1991 Kumasaka ............. B62D 25/06
296/193.03

(Continued)

FOREIGN PATENT DOCUMENTS

| DE | 19606779 A1 | 8/1997 |
|---|---|---|
| WO | 9916659 A1 | 4/1999 |

OTHER PUBLICATIONS

PCT International Search Report for related application PCT/US2017/56798 dated Dec. 14, 2017; 4 pp.

(Continued)

*Primary Examiner* — Bayan Salone
(74) *Attorney, Agent, or Firm* — Armstrong Teasdale LLP

(57) ABSTRACT

A method of assembling a vehicle including a vehicle frame includes assembling a center body of the vehicle by coupling a plurality of center body components to the vehicle frame, and, subsequent to assembling the center body, assembling at least one of a front body and a rear body of the vehicle, wherein assembling the front body of the vehicle comprises coupling a plurality of front body components to the vehicle frame, and wherein assembling the rear body of the vehicle comprises coupling a plurality of rear body components to the vehicle frame.

20 Claims, 24 Drawing Sheets

(56) References Cited

U.S. PATENT DOCUMENTS

| | | | | | |
|---|---|---|---|---|---|
| 5,319,840 | A | * | 6/1994 | Yamamoto | B62D 65/02 |
| | | | | | 29/430 |
| 5,682,646 | A | * | 11/1997 | Tyler, IV | E05D 5/062 |
| | | | | | 16/264 |
| 6,493,920 | B1 | * | 12/2002 | Hill | B62D 25/06 |
| | | | | | 29/430 |
| 9,616,935 | B2 | * | 4/2017 | Schnug | B62D 25/06 |
| 2001/0033096 | A1 | * | 10/2001 | Hanyu | B62D 21/15 |
| | | | | | 296/203.01 |
| 2016/0101815 | A1 | * | 4/2016 | Schnug | B62D 25/02 |
| | | | | | 296/187.12 |

OTHER PUBLICATIONS

PCT Written Opinion for related application PCT/US2017/567798 dated Dec. 14, 2017; 9 pp.
EPO Extended Search Report for European patent application 17862181.9 dated Sep. 22, 2020; 8 pp.

* cited by examiner

US 11,136,079 B2

METHODS AND SYSTEMS FOR ASSEMBLING A VEHICLE

CROSS-REFERENCE TO RELATED APPLICATIONS

This application is a U.S. National Phase Application of PCT/US2017/056798, filed Oct. 16, 2017, which claims the benefit of priority to U.S. Provisional Patent Application No. 62/409,117, filed Oct. 27, 2016, the entire contents and disclosures of which are incorporated by reference herein in their entirety.

BACKGROUND

The present disclosure relates generally to vehicles and, more particularly, to methods and systems for assembling a vehicle.

At least some known methods for assembling a vehicle include providing a frame and assembling the vehicle by installing vehicle body components on the frame in a relatively piecemeal fashion. For example, a vehicle may be assembled by installing, in order, side panels, a roof, a hood, a trunk, doors, and a windshield. Using such methods of assembly often precludes or reduces flexibility in adjusting alignment of these various components. Consequently, gaps between these components are typically set as a matter of manufacturing tolerances of adjacent components. It would be desirable, therefore, to provide a method of assembling a vehicle that facilitates improved alignment between vehicle body components and improved flexibility to adjust the gaps between components.

BRIEF SUMMARY

In one aspect, a method of assembling a vehicle including a vehicle frame is provided. The method includes aligning a first installation fixture with the vehicle frame, wherein the first installation fixture includes a roof panel and a windshield connected thereto, and coupling the roof panel and the windshield to the vehicle frame. The method further includes aligning an alignment feature of a second installation fixture with a door datum included on the vehicle frame, wherein the second installation fixture includes a center body component connected thereto. The method further includes coupling the center body component to the vehicle frame. The method further includes aligning, subsequent to the roof panel, the windshield, and the center body component being coupled to the vehicle frame, an alignment feature of a third installation fixture with the door datum, wherein the third installation fixture includes a front body component connected thereto. The method further includes coupling the front body component to the vehicle frame. The method further includes aligning, subsequent to the roof panel, the windshield, and the center body component being coupled to the vehicle frame, an alignment feature of a fourth installation fixture with the vehicle frame, wherein the fourth installation fixture includes a rear body component connected thereto, and coupling the rear body component to the vehicle frame.

In another aspect, a method of assembling a vehicle including a vehicle frame is provided. The method includes assembling a center body of the vehicle by coupling a plurality of center body components to the vehicle frame, and, subsequent to assembling the center body, assembling at least one of a front body and a rear body of the vehicle. Assembling the front body of the vehicle includes coupling a plurality of front body components to the vehicle frame, and assembling the rear body of the vehicle includes coupling a plurality of rear body components to the vehicle frame.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to methods and systems for assembling a vehicle. In contrast to at least some known methods of vehicle assembly, the systems and methods described herein facilitate alignment of vehicle body components by assembling the vehicle from the center of the vehicle outwards towards the front and rear ends of a vehicle frame. More particularly, a center body of the vehicle is first coupled to a center portion of the vehicle frame. Thereafter, a front body or a rear body is coupled to the vehicle frame. Assembling and installing the center body onto the vehicle frame before the front and/or rear body facilitates more consistent and precise alignment of all body components of the vehicle, with respect to the frame and with respect to other body components. The methods and systems disclosed herein may be applied to any vehicle, including cars, and may be particularly suitable for use with high-performance vehicles including, for example and without limitation, supercars.

Figure 1:
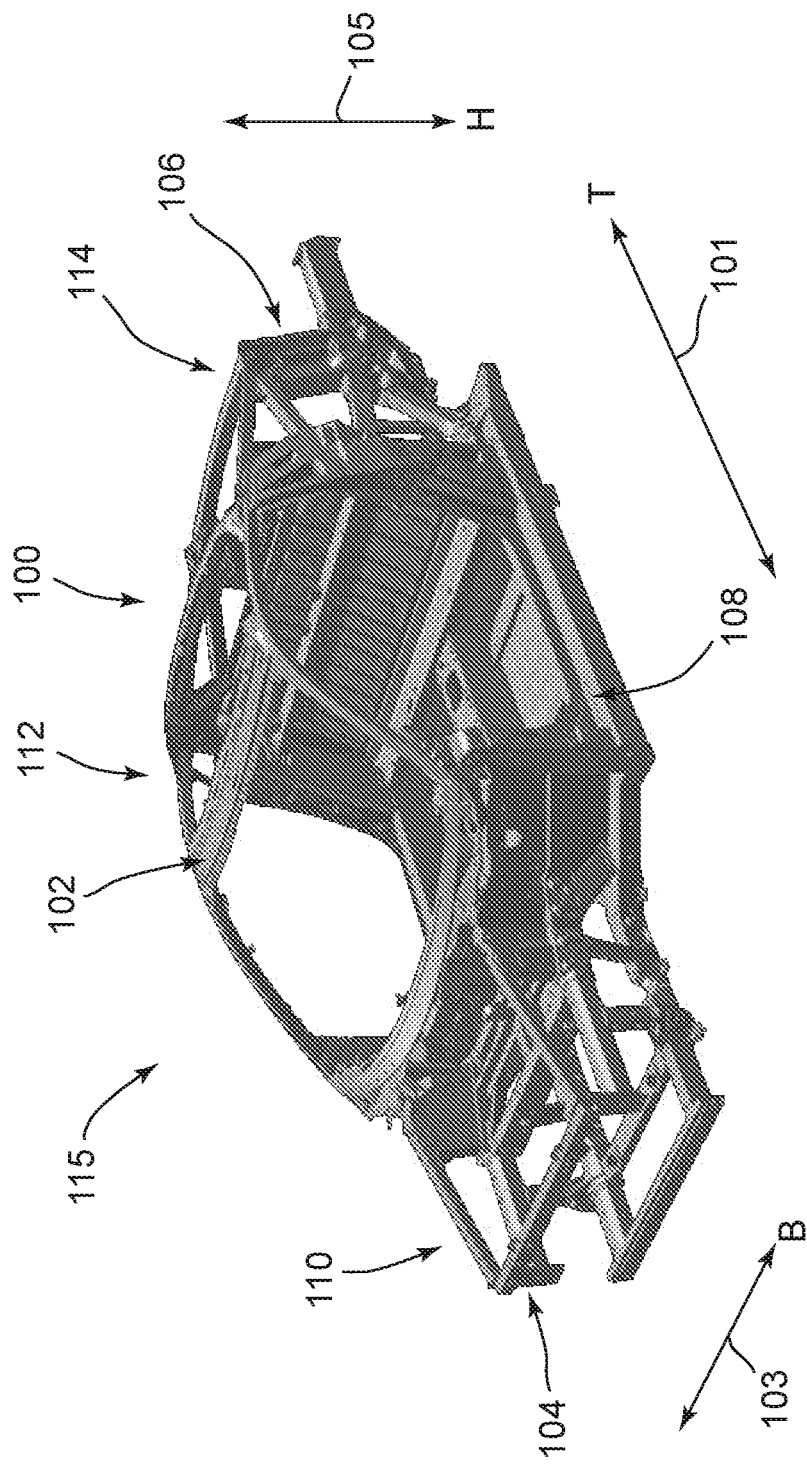
FIG. 1 is a perspective view of an exemplary vehicle frame.
Figure 2:
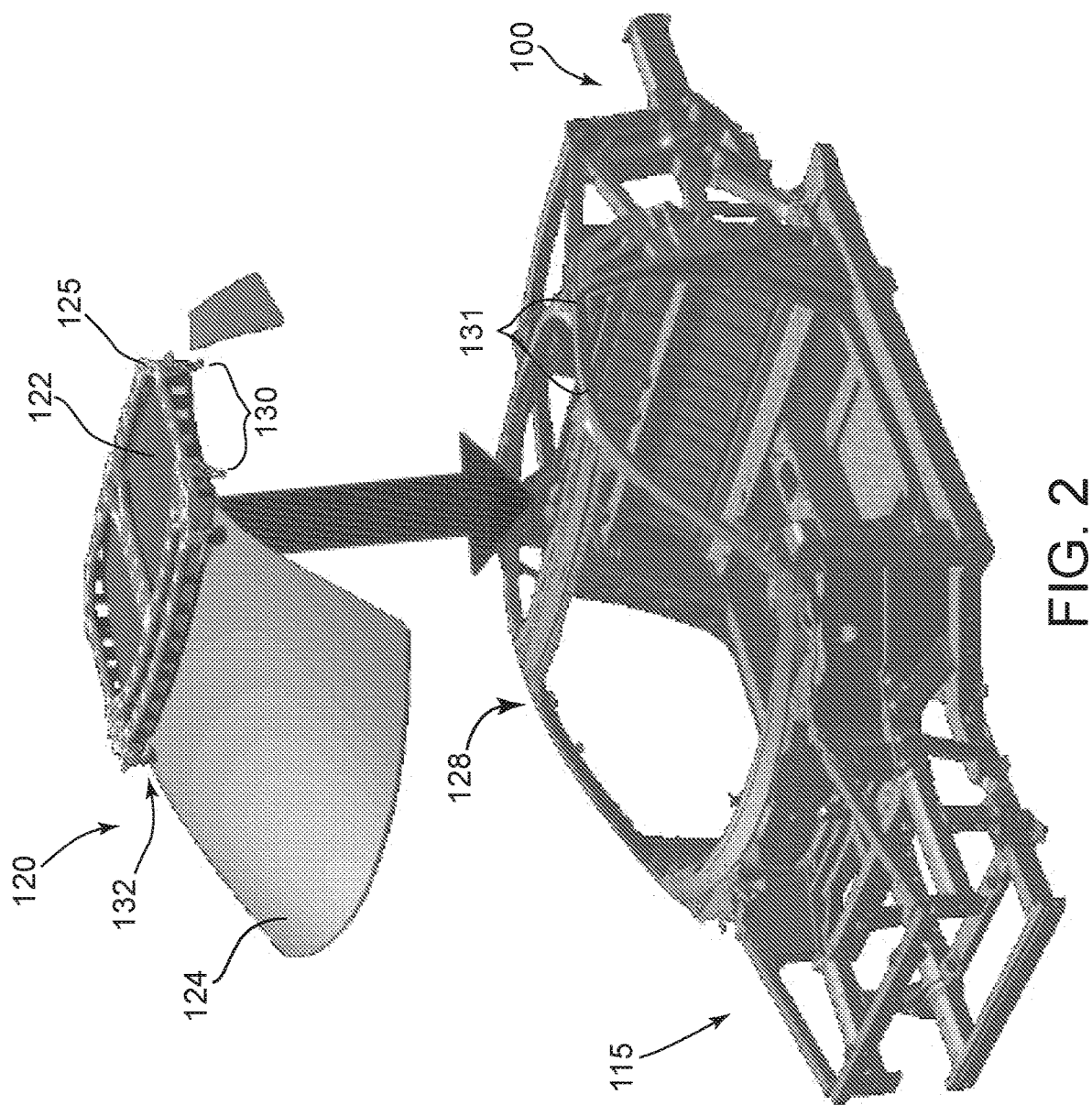
FIG. 2 is a perspective view of the vehicle frame shown in FIG. 1 during a first phase of vehicle assembly in which center body components are coupled to the vehicle frame.

FIG. 1 is a perspective view of an exemplary vehicle frame 100. Frame 100 represents an assemblage of welded and/or otherwise coupled components that form the structural support of a vehicle. In the exemplary embodiment, frame 100 has a top surface 102, a front surface 104, a rear surface 106, and two side surfaces 108 (only one side surface 108 being labeled in FIG. 1). In addition, frame 100 includes a front portion 110, a center portion 112, and a rear portion 114. Frame 100 may be any suitable vehicle frame and may be constructed from any suitable frame material (e.g., steel, aluminum, etc.). The vehicle frame 100 extends a length along a longitudinal or "front-to-back" T direction 101 from rear portion 114 to front portion 110. Further, the vehicle frame 100 extends a width in a "left-to-right" or transverse B direction 103, and a height in a "top-to-bottom" or vertical H direction 105.

A vehicle 115 is assembled from frame 100 and a plurality of body components, shown and described further herein. "Body components" generally include exterior components of a vehicle that are coupled to frame 100 to assemble the vehicle. Such assembly takes place through a plurality of phases. In the illustrated embodiment, frame 100 is "bare", or does not include any other components other than frame 100. However, it should be understood that frame 100 may have any number of other vehicle components pre-installed or previously coupled thereto prior to the methods of vehicle assembly described herein. Such vehicle components include, for example and without limitation, an engine, a suspension assembly, wheels, etc.

A first phase of the assembly of a vehicle is shown and described with reference to FIGS. 2-5. In the first phase of vehicle assembly, one or more center body components 120 are coupled to frame 100 using at least one roof installation fixture 125. In the exemplary embodiment, center body components 120 include a roof panel 122 and a windshield 124. Roof panel 122 and windshield 124 are coupled to roof installation fixture 125 and may be installed onto or coupled to frame 100 using any suitable installation method.

In the exemplary embodiment, roof panel 122 is coupled to frame 100 using a bonding agent. Suitable bonding agents that may be used to couple roof panel 122 to frame 100 include, for example and without limitation, urethane. In the exemplary method, the bonding agent is applied to roof panel 122 while roof installation fixture 125 is spaced from frame 100. Roof installation fixture 125 is subsequently moved towards vehicle frame 100 to locate roof panel 122 relative to frame 100, and clamp or otherwise hold roof panel 122 against frame 100 while the bonding agent cures. It should be understood that, similarly, windshield 124 may be coupled to frame 100 using urethane (and/or any other suitable installation method) and, as such, urethane may also be applied to windshield 124 while roof installation fixture 125 is spaced from frame 100.

Figure 3:
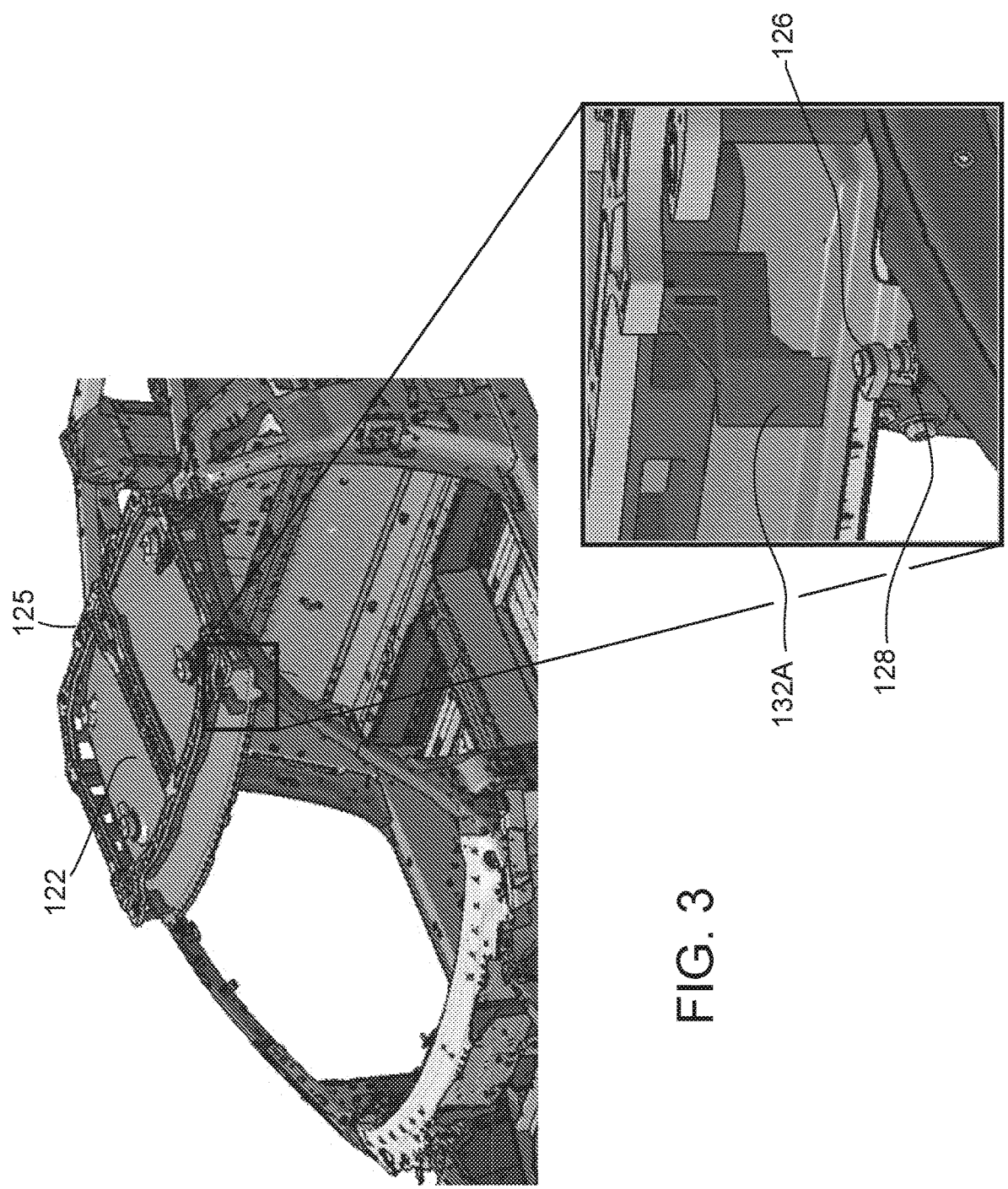
FIGS. 3 and 4 are expanded views of the vehicle frame during the first phase of vehicle assembly.
Figure 4:
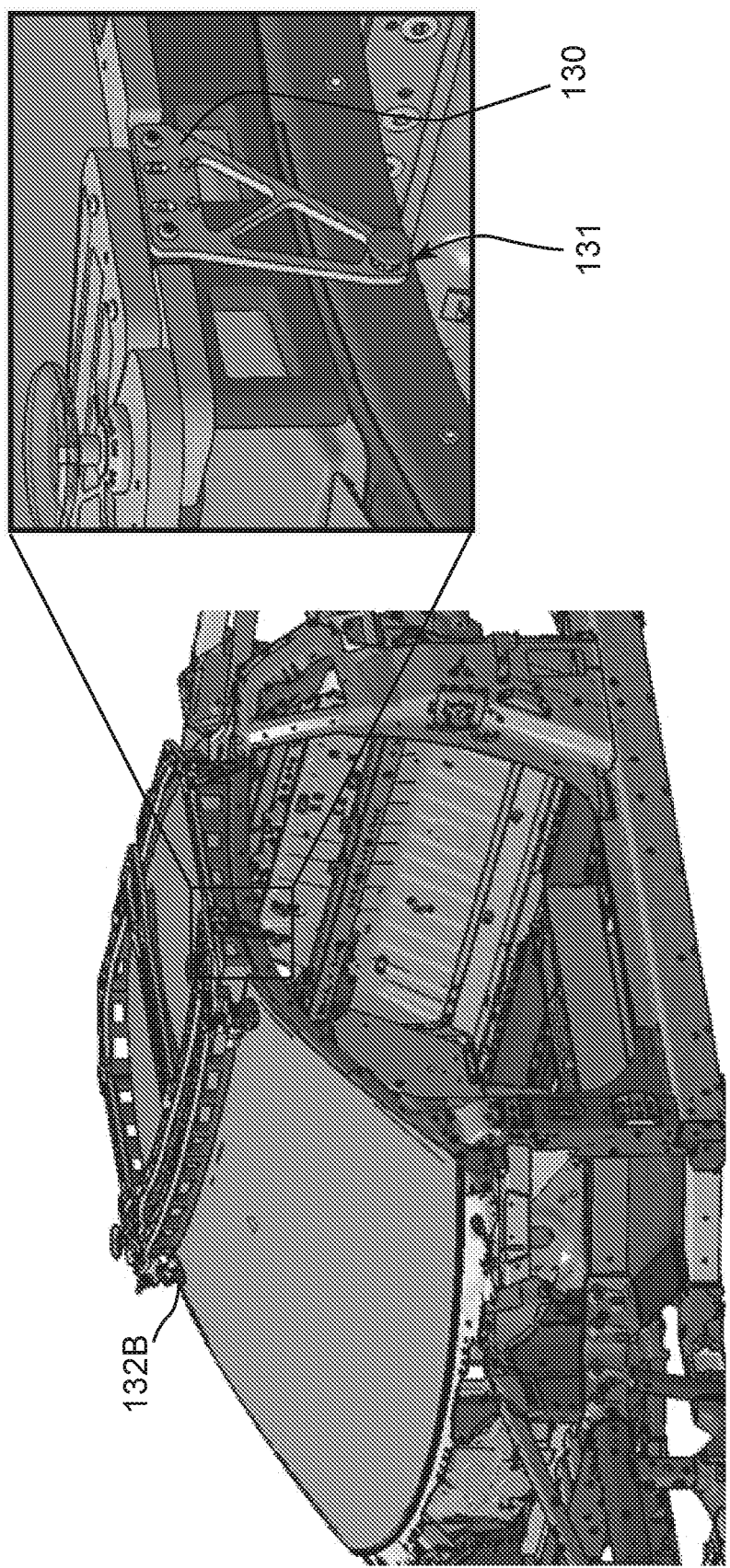
Figure 5:
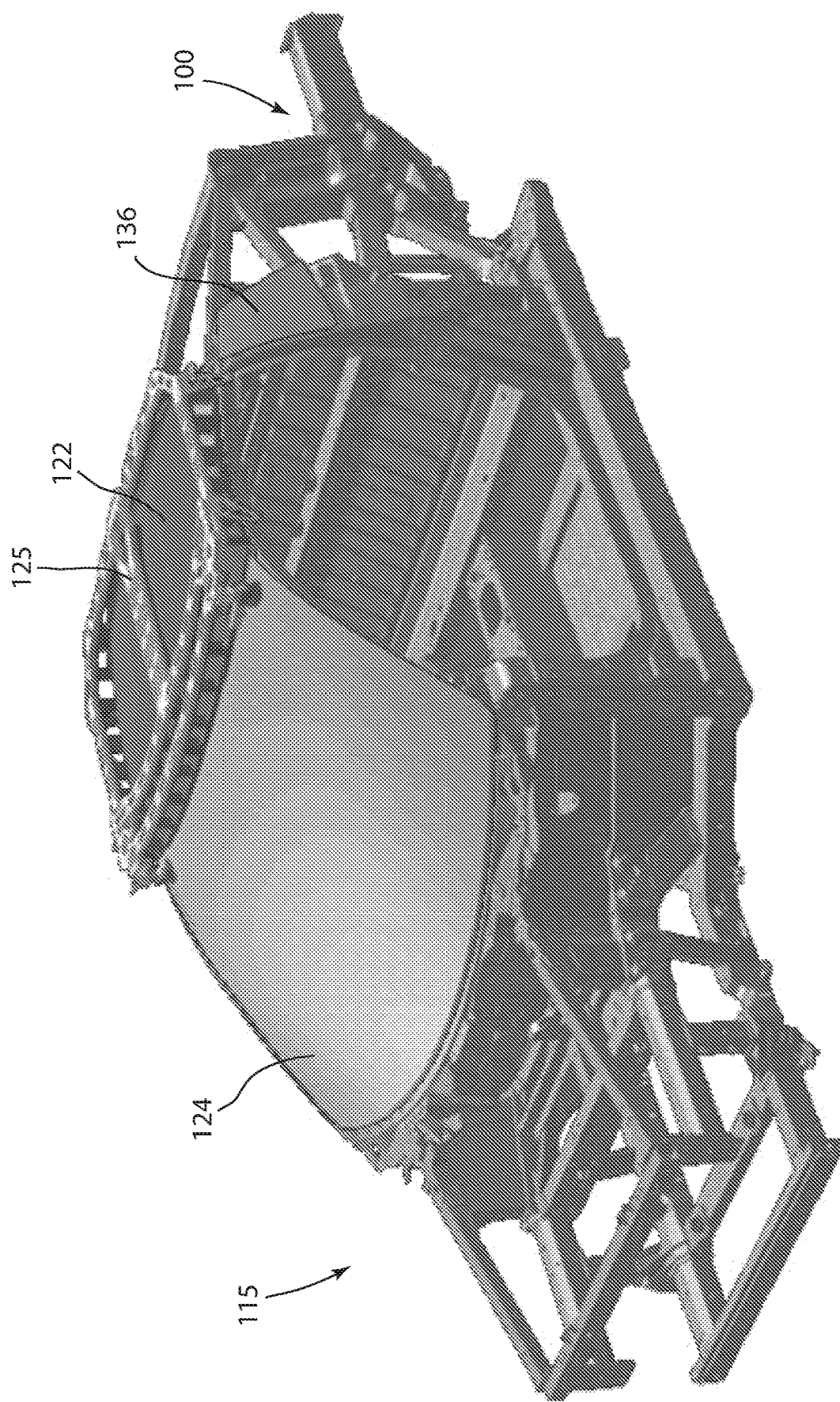
FIG. 5 is another perspective view of the vehicle frame shown in FIG. 1 during the first phase of vehicle assembly.

Roof installation fixture 125 is advanced towards frame 100 to install roof panel 122 (and/or windshield 124) onto frame 100. As illustrated in FIG. 3, roof panel 122 includes one or more alignment features 126, which may include pins, posts, tabs, hooks, and/or any other suitable alignment features. In the illustrated embodiment, alignment features 126 align with openings 128 in frame 100. In particular, alignment features 126 align roof panel 122 (and roof installation fixture 125) in the B direction 103 and the T direction 101, with respect to frame 100. In one embodiment, alignment features 126 are configured to align roof panel 122 with respect to frame 100 before windshield 124 is coupled to roof installation fixture 125 and/or coupled to frame 100. For example, alignment feature 126 may include pins that are used to align roof panel 122 in the T direction 101 and the B direction 103, then are removed to permit installation of windshield 124. In the exemplary embodiment, roof installation fixture 125 also includes alignment features 130 (shown in FIGS. 2 and 4), which may include spring pins, bolts, clamps, hooks, and/or any other suitable alignment features. Alignment features 130 not only align with openings 131 in frame 100, but also clamp or otherwise hold roof installation fixture 125 against frame 100 while the bonding agent on roof panel 122 (and/or on windshield 124) cures, to set roof panel 122 appropriately in the H direction 105, with respect to frame 100.

Figure 6:
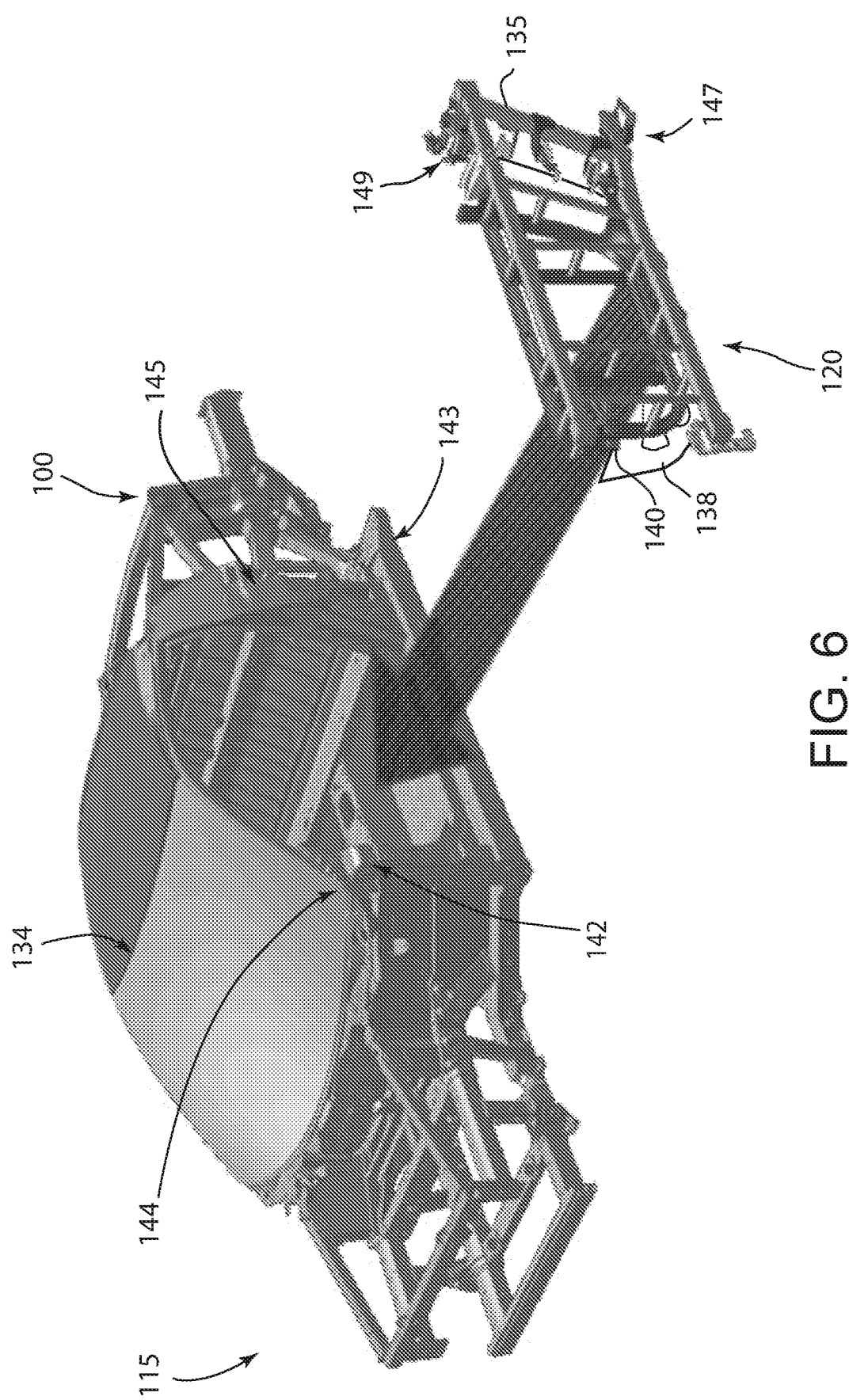
FIG. 6 is a perspective view of the vehicle frame shown in FIG. 1 during a second phase of vehicle assembly in which center body components are coupled to the vehicle frame.
Figure 7:
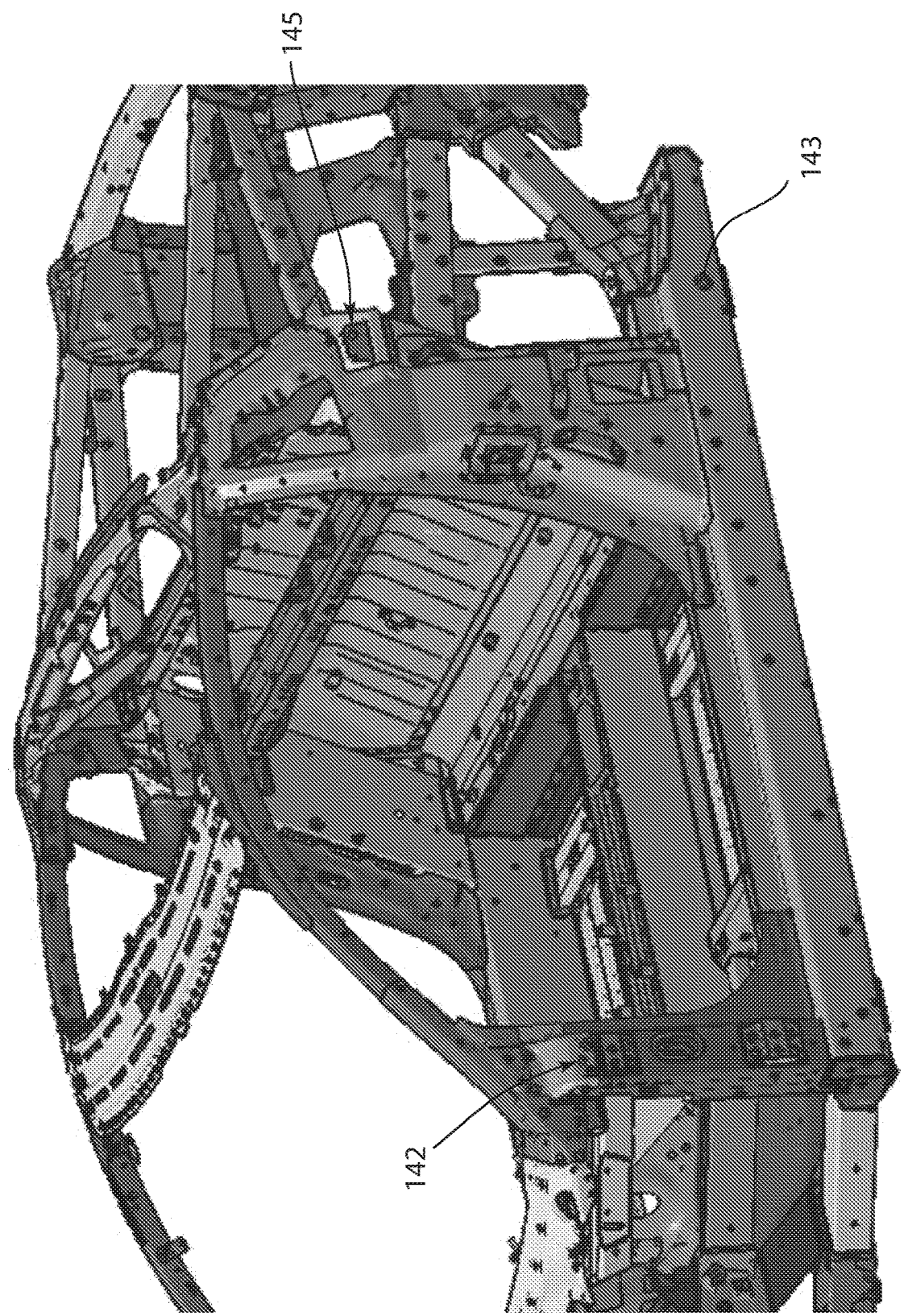
FIG. 7 is an expanded view of the vehicle frame illustrating the configuration of one or more alignment data.
Figure 8:
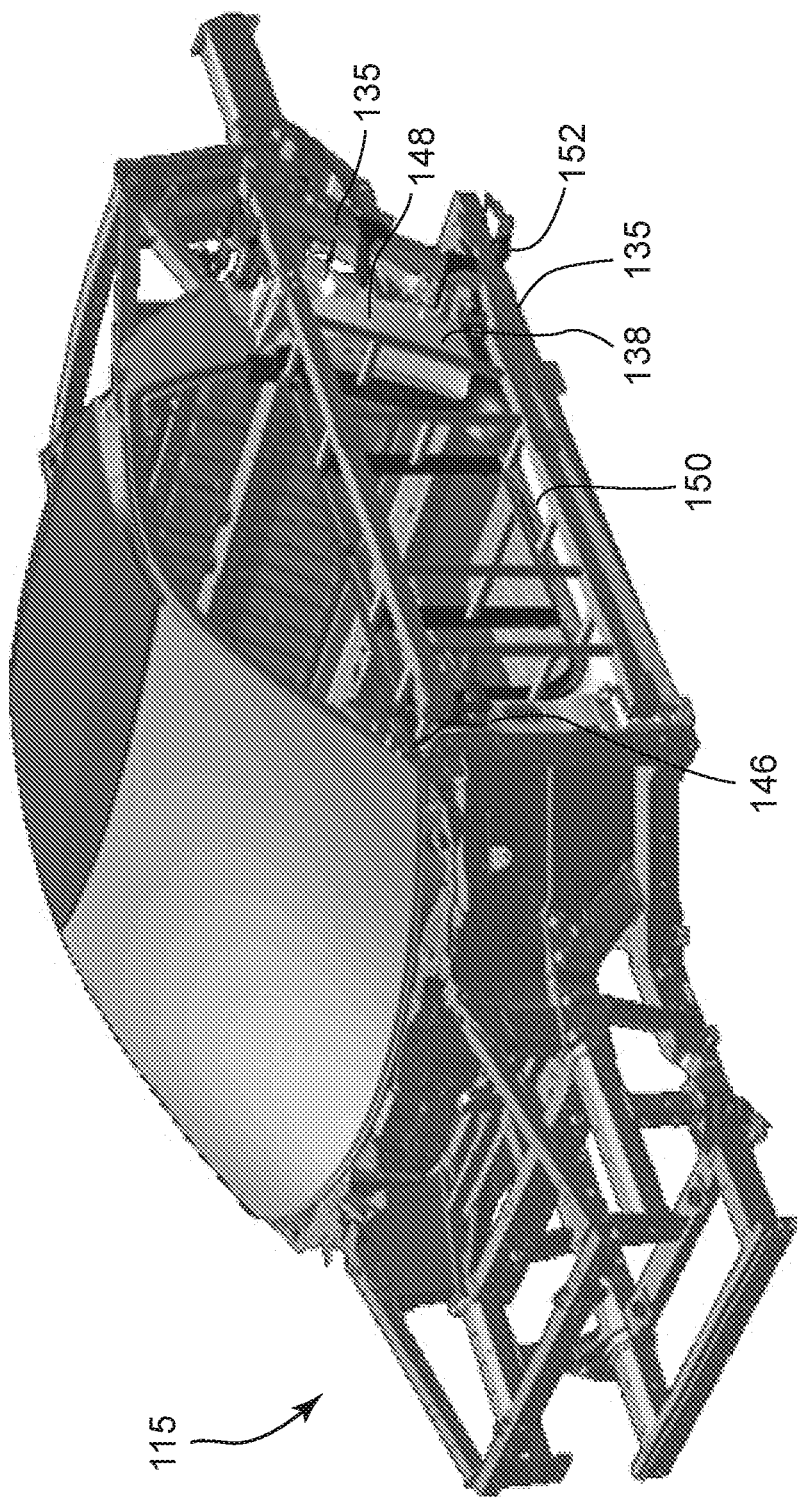
FIG. 8 is another perspective view of the vehicle frame shown in FIG. 1 during the second phase of vehicle assembly.
Figure 9:
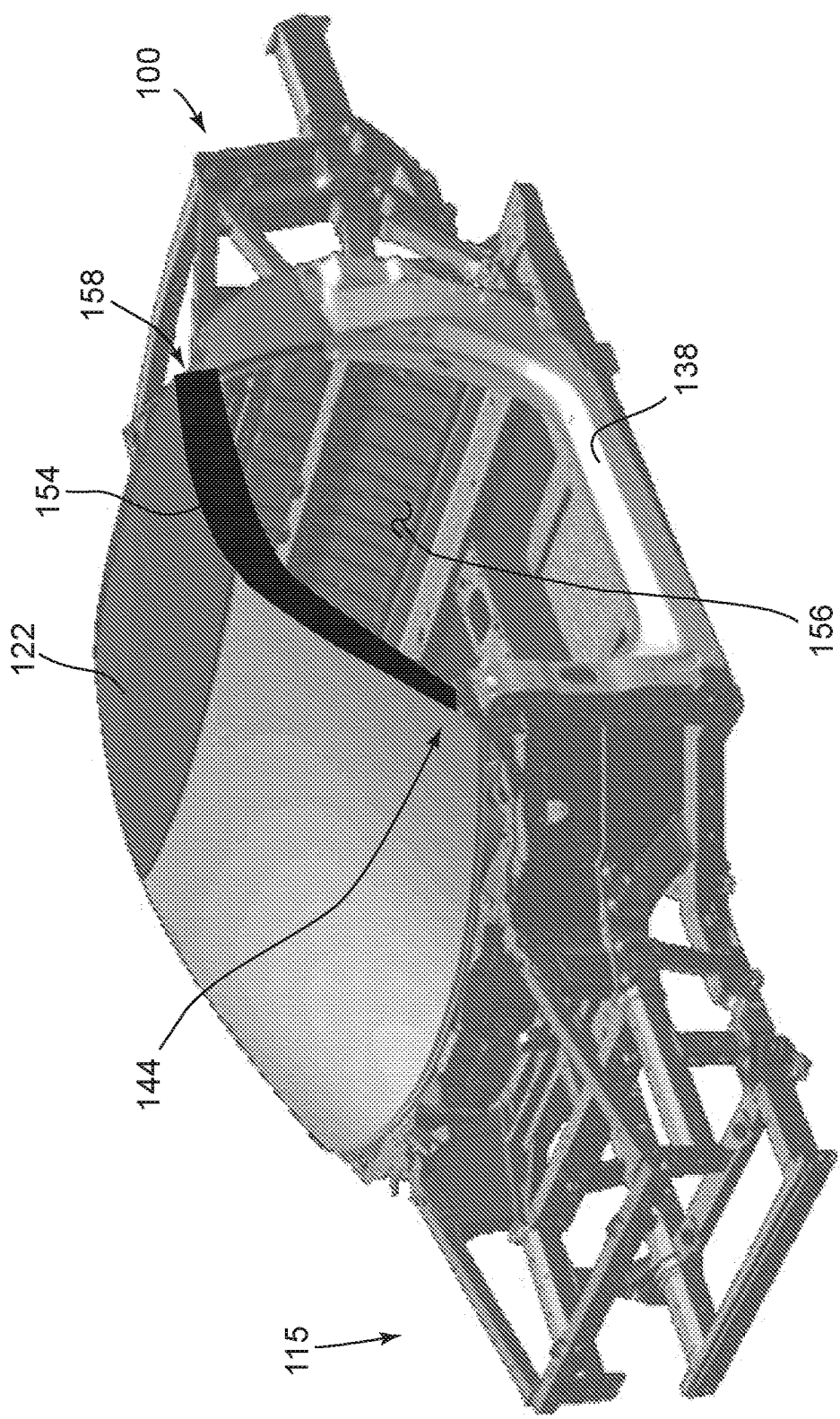
FIG. 9 is another perspective view of the vehicle frame shown in FIG. 1 during the second phase of vehicle assembly.

In the illustrated embodiment, roof installation fixture 125 includes windshield setting features 132 such that roof installation fixture 125 enables simultaneous installation of roof panel 122 and windshield 124. Windshield setting features 132 are configured to align windshield 124 with roof panel 122. In the illustrated embodiment, roof installation fixture 125 includes two types of windshield setting features 132. More specifically, windshield setting features 132A (shown in FIG. 3) set windshield in the T direction 101 with respect to roof panel 122 (i.e., set an appropriate gap 134 between windshield 124 and roof panel 122, as shown in FIG. 6), and windshield setting features 132B (shown in FIG. 4) secure windshield 124 in alignment with roof panel 122 in the B direction 103 (i.e., centering windshield 124 between lateral sides of frame 100). Accordingly, by installing windshield 124 simultaneously with roof panel 122, windshield 124 may be more consistently installed with respect to roof panel 122. Windshield setting features 132 may include, for example and without limitation, clamps, spacers, hooks, suction cups, and any other suitable setting feature.

In some embodiments, additional center body components 120 may be coupled to frame 100 during the first phase of assembly. For example, quarter glass 136 (FIG. 5) may be installed on one or both sides of frame 100. Quarter glass 136 may be installed using any installation method, such as via a bonding agent, via one more setting features (e.g., clips, pins, tabs, etc.) that couple to frame 100, and/or any other installation method. Although quarter glass 136 is not shown as being installed using roof installation fixture 125, it should be understood that alternative embodiments of roof installation fixture 125 may accommodate simultaneous installation of quarter glass 136 with roof panel 122 and/or windshield 124. Additionally or alternatively, rear interior glass (not shown) may be coupled to frame 100 during the first phase of assembly. The rear interior glass separates an interior of the (assembled) vehicle (e.g., a passenger compartment) from an engine compartment of the vehicle. The rear interior glass may be installed using any installation method, such as via a bonding agent, via one more setting features (e.g., clips, pins, tabs, etc.) that couple to frame 100, and/or any other installation method.

A second phase of assembly of vehicle 115 is illustrated in FIGS. 6-9. In the second phase, one or more center body components 120 are coupled to frame 100 using at least one garnish installation fixture 135. In the exemplary embodiment, center body components 120 that are coupled to frame 100 during the second phase of assembly may include a door ring garnish 138. Door ring garnish 138 is coupled to garnish installation fixture 135 and may be installed onto or coupled to frame 100 using any suitable installation method.

In the illustrated embodiment, door ring garnish 138 is coupled to center portion 112 of frame 100 using a bonding agent, such as urethane. The bonding agent is applied to door ring garnish 138 while garnish installation fixture 135 is spaced from frame 100. Garnish installation fixture 135 is subsequently moved towards frame 100 to locate door ring garnish 138 relative to frame 100 and clamp or otherwise hold door ring garnish 138 against frame 100 while the bonding agent cures.

Garnish installation fixture 135 is advanced towards frame 100 to install door ring garnish 138. Garnish installation fixture 135 includes at least one alignment feature 140 that aligns with a primary door datum 142 (see FIG. 7) defined by frame 100. Suitable alignment features for garnish installation fixture alignment feature 140 include, for example and without limitation, pins, posts, tabs, hooks, and/or any other suitable alignment features that enable the method to be performed as described herein. Primary door datum 142 is at least one opening defined in side surface 108 of frame 100 positioned and/or configured specifically for the alignment functions described herein. In the illustrated embodiment, primary door datum 142 is located proximate a "side mirror location" 144 of frame 100 (e.g., a location where a side mirror of the assembled vehicle is eventually installed). Aligning alignment feature 140 with primary door datum 142 aligns garnish installation fixture 135 in the T direction 101, the B direction 103, and the H direction 105 relative to frame 100. Accordingly, a first end 146 of door ring garnish 138 is appropriately aligned in all three directions 101, 103, 105 on frame 100 when alignment feature 140 is aligned with primary door datum 142. A second end 148 of door ring garnish 138 and a body 150 of door ring garnish 138 (extending between first end 146 and second end 148) may then be appropriately positioned onto frame 100. More particularly, second end 148 of door ring garnish 138 is aligned using a secondary door datum 143 and a tertiary door datum 145 (see FIG. 7). Secondary and tertiary door data 143, 145 are each at least one opening defined in side surface 108 of frame 100 positioned and/or configured specifically for the alignment functions described herein. Garnish installation fixture 135, in the illustrated embodiment, includes secondary and tertiary alignment features 147 and 149, respectively. Secondary alignment feature 147 aligns with secondary door datum 143 to align second end 148 of door ring garnish 138 in the B direction 103 and the H direction 105. Tertiary alignment feature 149 aligns with tertiary door datum 145 to align second end 148 of door ring garnish 138 in the B direction 103. In alternative embodiments, garnish installation fixture 135 may include additional, fewer, and/or alternative alignment features configured to align with corresponding additional, fewer, and/or alternative door data.

Although only one primary door datum 142, secondary door datum 143, and tertiary door datum 145 are shown in FIGS. 6-9, it should be understood that the opposing side of vehicle frame 100 (i.e., the "right" side or passenger side of vehicle frame 100) may also include a primary door datum, secondary door datum, and/or tertiary door datum for aligning center body components 120 on the passenger side of vehicle 115.

In the illustrated embodiment, garnish installation fixture 135 further includes setting features 152, which may include clamps, hooks, and/or any other suitable setting features. Setting features 152 clamp or otherwise hold garnish installation fixture 135 against frame 100 while the bonding agent on door ring garnish 138 cures to set door ring garnish 138 appropriately in all three directions 101, 103, and 105 with respect to frame 100.

In the illustrated embodiment, an additional center body component 120 including an A-pillar panel 154 (see FIG. 9) is also preliminarily installed during the second phase of assembly. A-pillar panel 154 is a panel that extends from side mirror location 144, over a door or window opening 156, to a side window location 158. In the illustrated embodiment, A-pillar panel 154 is "loosely" or preliminarily installed during the second phase of assembly by screwing, bolting, or otherwise installing A-pillar panel 154 onto frame 100. More specifically, A-pillar panel 154 is appropriately positioned in the H direction 105, such that A-pillar panel 154 is aligned with respect to roof panel 122. However, A-pillar panel 154 may be adjustable or movable in the T direction 101 after preliminary installation. Although A-pillar panel 154 is not shown as being installed using garnish installation fixture 135, it should be understood that alternative embodiments of garnish installation fixture 135 may accommodate simultaneous installation of A-pillar panel 154 with door ring garnish 138.

In some embodiments, one or more additional body components may be coupled to frame 100 during the second phase of vehicle assembly. For example, one or more fender brackets (not shown) may be coupled to frame 100 during the second phase.

Figure 10:
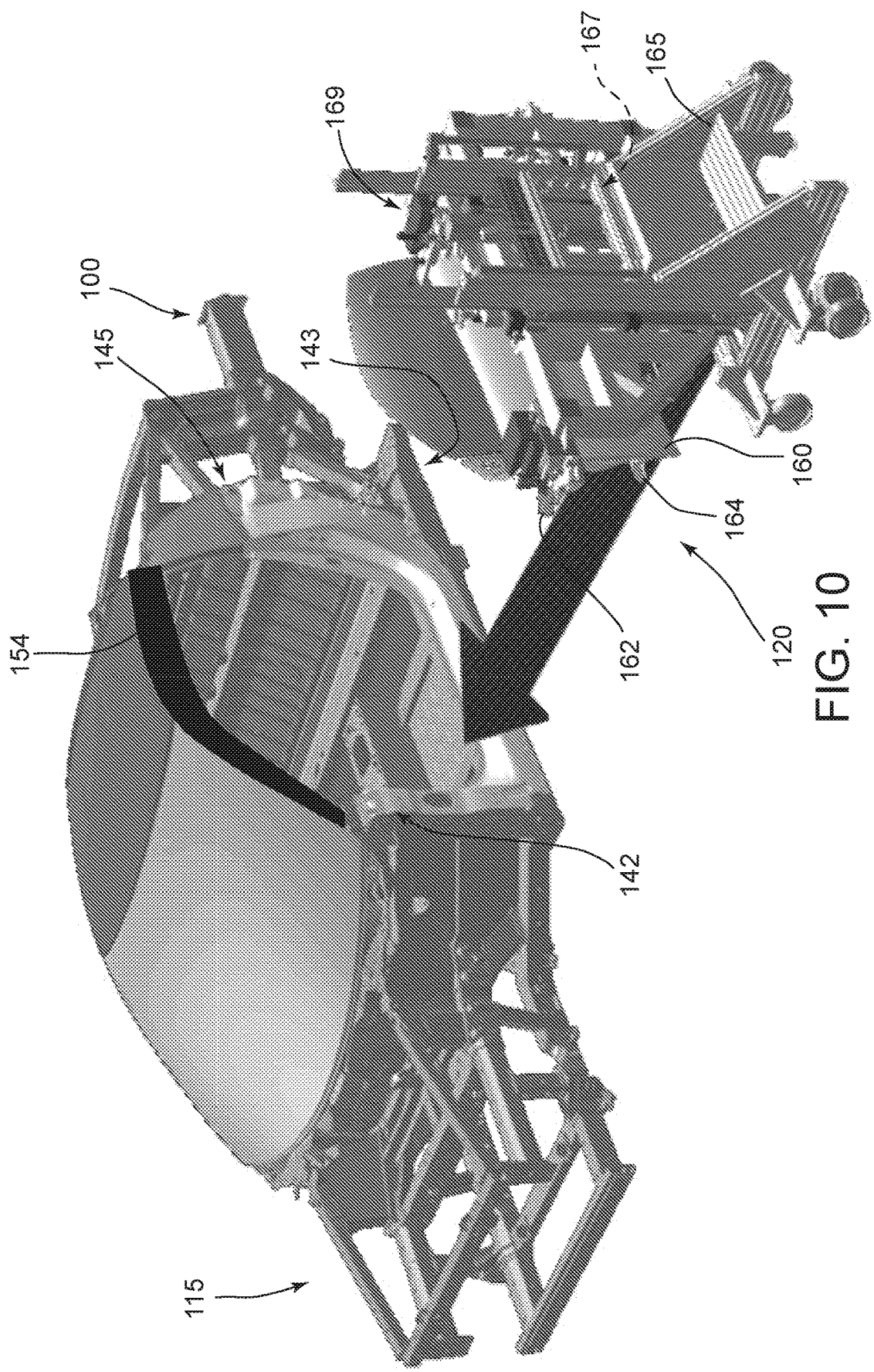
FIG. 10 is a perspective view of the vehicle frame shown in FIG. 1 during a third phase of vehicle assembly in which center body components are coupled to the vehicle frame.
Figure 11:
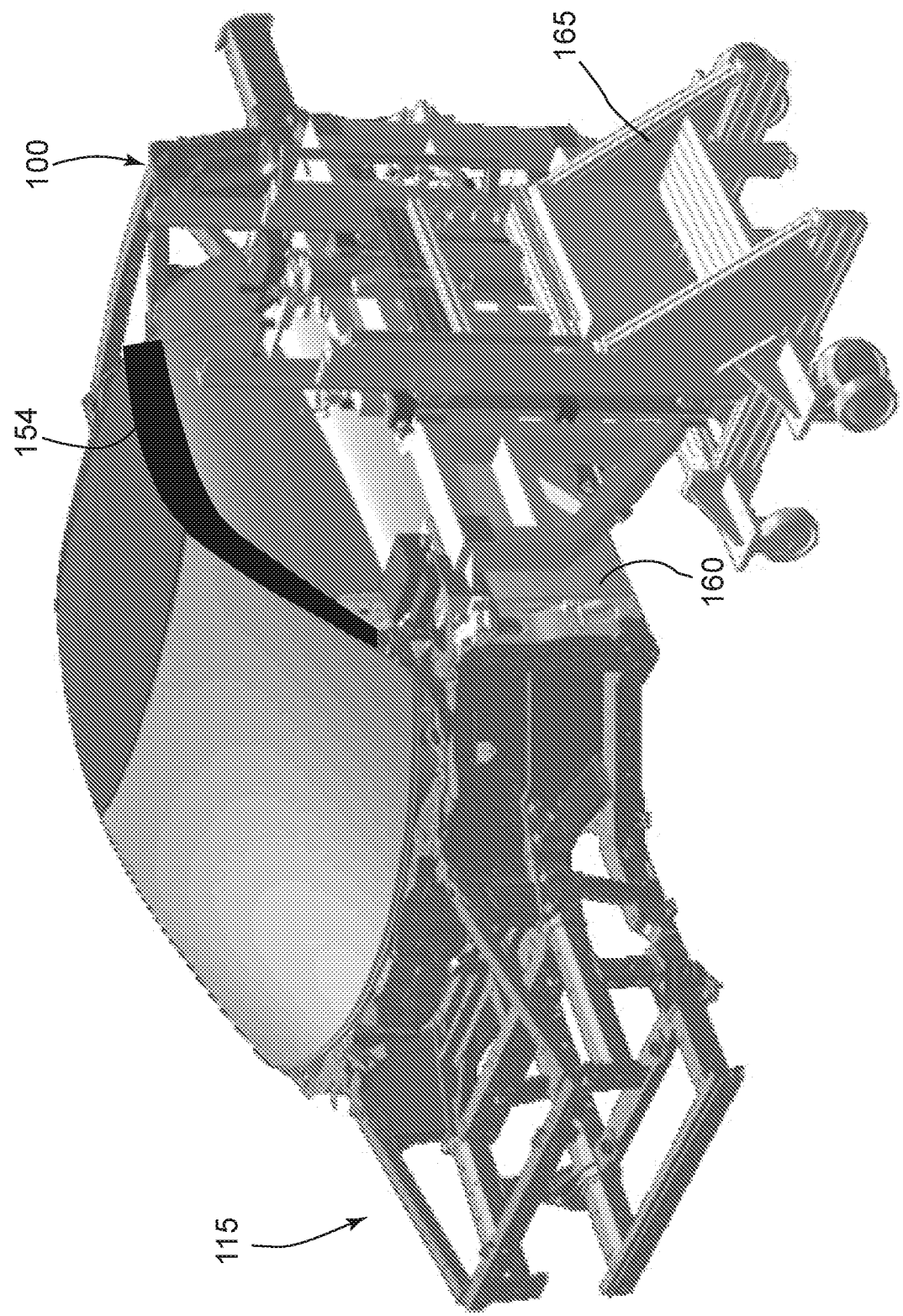
FIG. 11 is another perspective view of the vehicle frame shown in FIG. 1 during the third phase of vehicle assembly.
Figure 12:
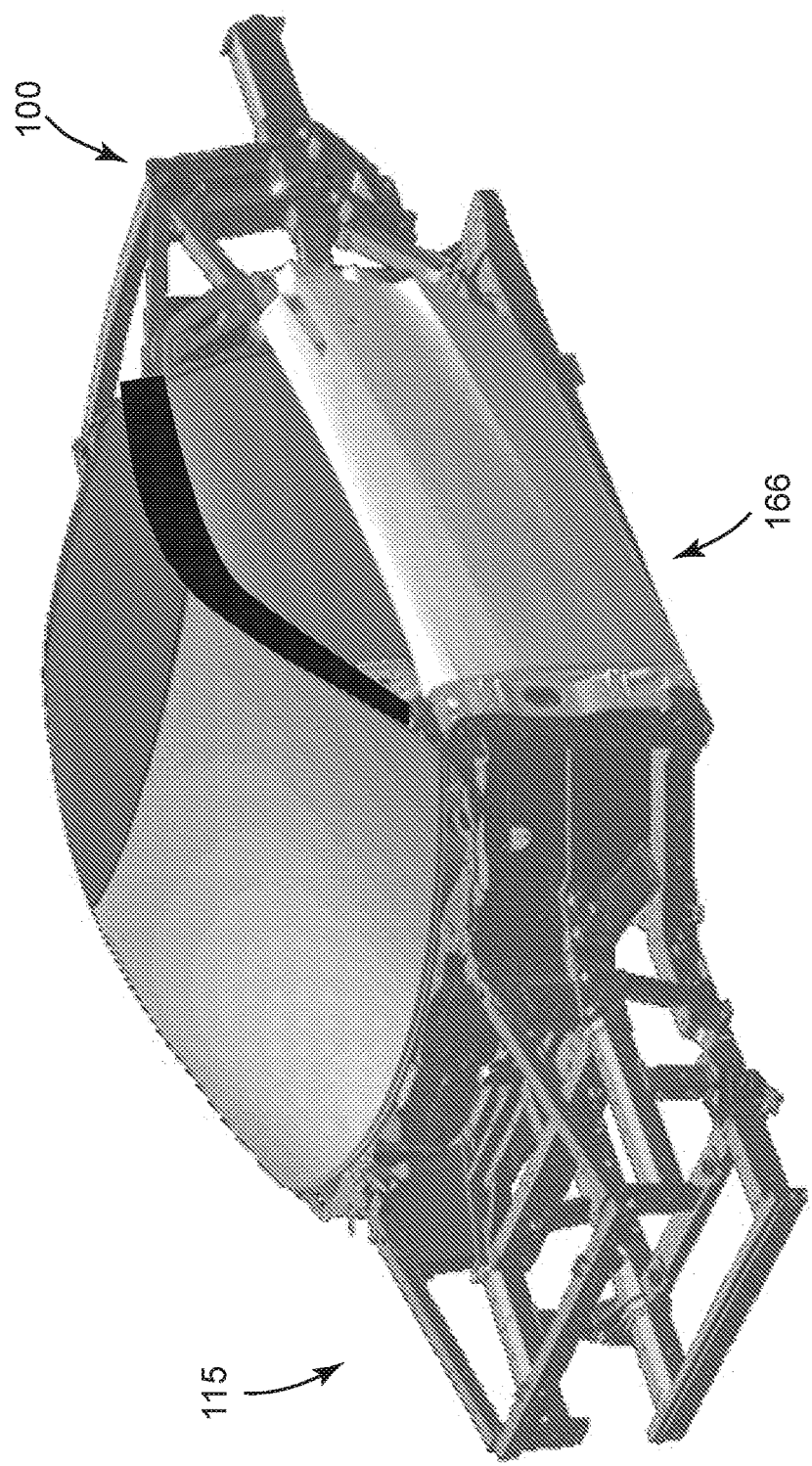
FIG. 12 is perspective view of the vehicle frame shown in FIG. 1 with an assembled center body of a vehicle installed thereon.
Figure 13:
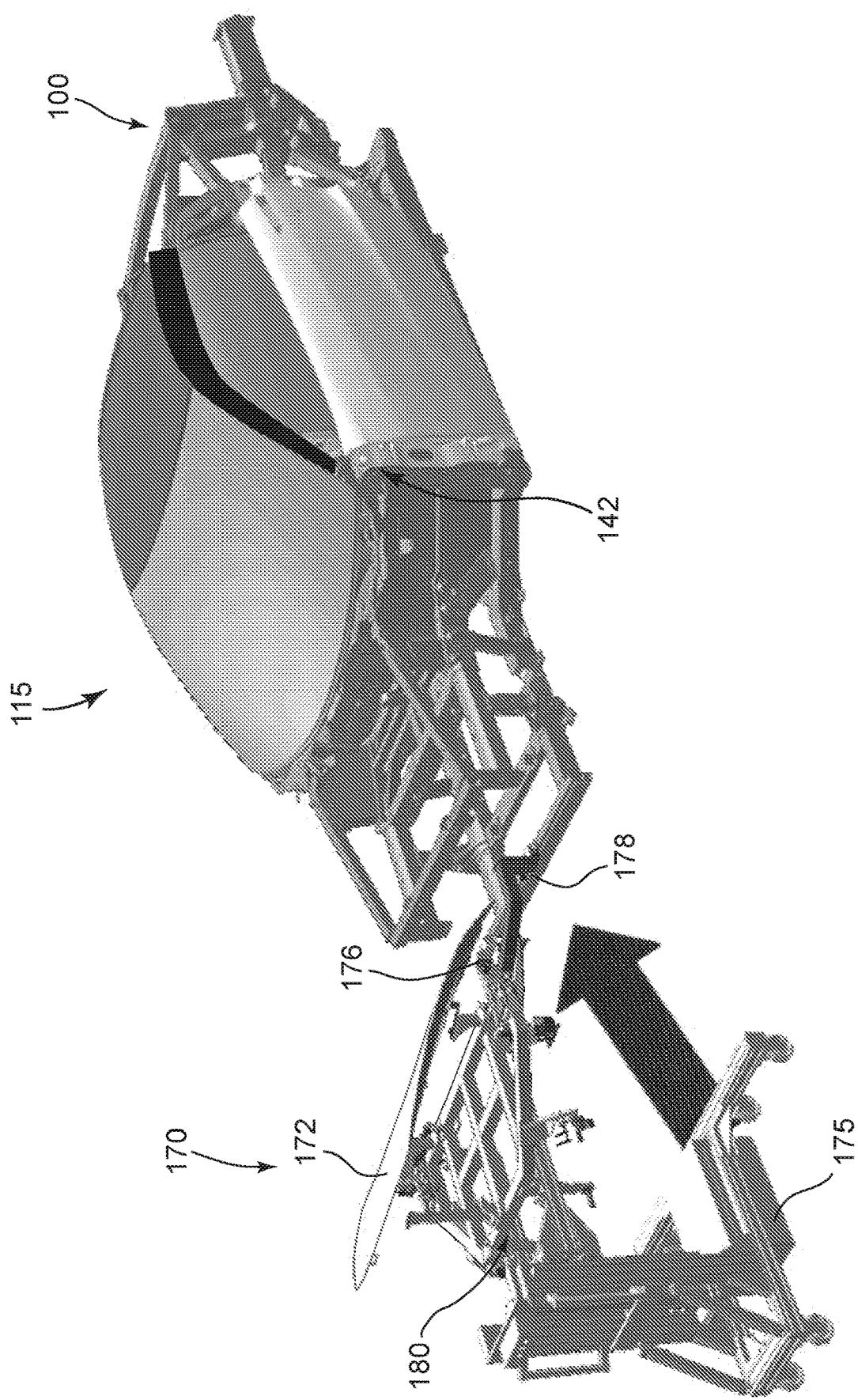
FIG. 13 is a perspective view of the vehicle frame shown in FIG. 1 during a fourth phase of vehicle assembly in which front body components are coupled to the vehicle frame.
Figure 14:
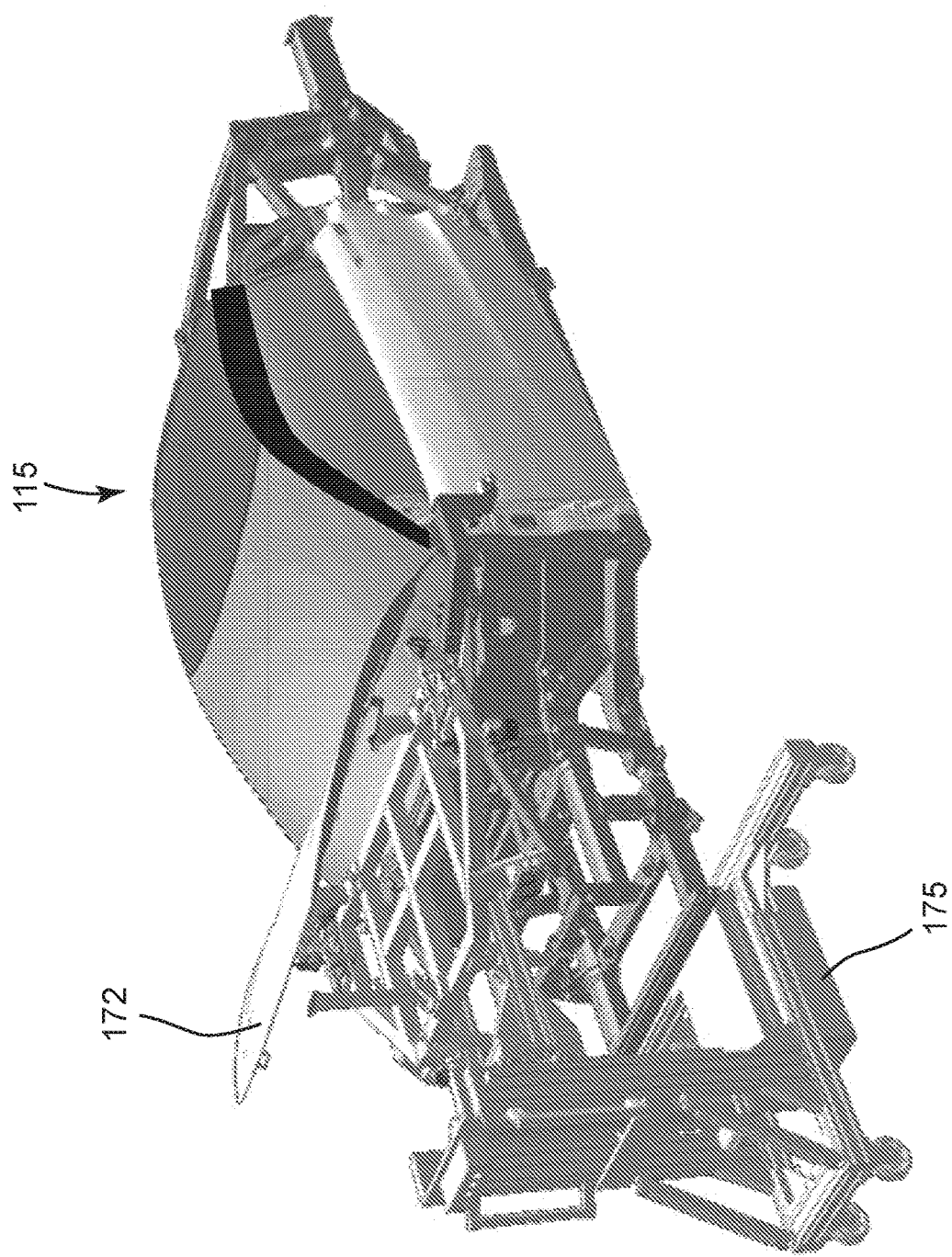
FIG. 14 is another perspective view of the vehicle frame shown in FIG. 1 during the fourth phase of vehicle assembly.
Figure 15:
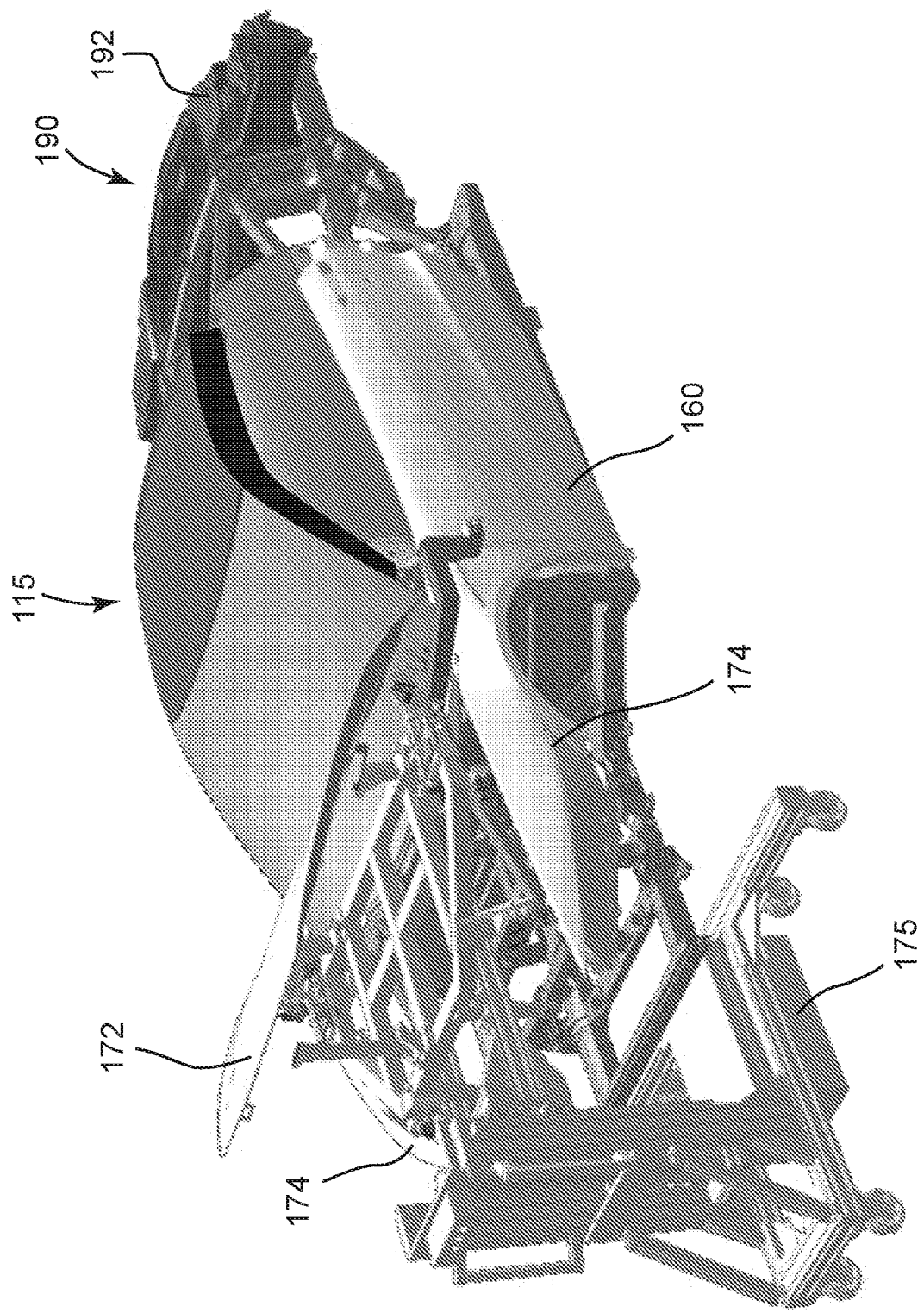
FIG. 15 is another perspective view of the vehicle frame shown in FIG. 1 during the fourth phase of vehicle assembly.

A third phase of assembly of vehicle 115 is illustrated in FIGS. 10-12. In the third phase, one or more center body components 120 are coupled to frame 100 using at least one door installation fixture 165. In the exemplary embodiment, center body components 120 that are coupled to frame 100 during the third phase of assembly may include one or more doors 160. It should be understood that although installation of only one door 160 is illustrated in FIGS. 10-12, the same method may be applied for another door 160 on the opposite side of frame 100.

Door 160 is coupled to door installation fixture 165, and door installation fixture 165 is advanced towards frame 100 to install door 160 onto center portion 112 of frame 100. Door installation fixture 165 includes at least one alignment feature 162, which may include a pin, a post, a tab, a hook, and/or any other suitable alignment feature. In the illustrated embodiment, alignment feature 162 aligns with the same primary door datum 142 on frame 100 used to align garnish installation fixture 135. Aligning alignment feature 162 with primary door datum 142 aligns door installation fixture 165 in the T direction 101, the B direction 103, and the H direction 105, relative to frame 100. Accordingly, door 160 is aligned in all three directions and may be coupled to frame 100 in appropriate alignment. For example, hinges 164 on one side of door 160 may be coupled to frame 100 to secure door 160 in position. In the illustrated embodiment, door installation fixture 165 further includes secondary and tertiary alignment features 167 and 169, respectively. Secondary alignment features 167 align with secondary door datum 143, and tertiary alignment features 169 align with tertiary door datum 145, to ensure alignment of door installation fixture 165 (and, therefore, door 160) in the B and H directions 103, 105. In alternative embodiments, door installation fixture 165 may include additional, fewer, and/or alternative alignment features configured to align with corresponding additional, fewer, and/or alternative door data.

In some embodiments, A-pillar panel 154 is further secured in position at the third phase of assembly, after installation of door 160. More particularly, A-pillar panel 154 is aligned in the T direction 101 with respect to door 160 after door 160 is installed, and A-pillar panel 154 is further secured to frame 100 in appropriate alignment. That is, A-pillar panel 154 is non-movably secured to frame 100 during the third phase of assembly.

Although the first, second, and third phases of assembly have been described as occurring in a particular order, such order is illustrative only. For example, in some embodiments, the "second" phase and "third" phases described herein may occur prior to the "first" phase (e.g., door ring garnish 138 and door 160 may be installed prior to roof panel 122 and/or windshield 124). FIG. 12 illustrates a partially assembled state of vehicle 115, with an assembled center body 166 installed onto center portion 112 of frame 100.

A fourth phase of assembly of vehicle 115 is illustrated in FIGS. 13-17. In the fourth phase of vehicle assembly, one or more front body components 170 are coupled to front portion 110 frame 100 using at least one front fascia installation fixture 175. In the exemplary embodiment, front body components 170 include a hood 172 and front fenders 174.

Hood 172 and front fenders 174 are coupled to front fascia installation fixture 175. Although front fenders 174 are not shown in FIGS. 13-14, it should be understood that front fenders 174 may be coupled to front fascia installation fixture 175 simultaneously with hood 172 such that hood 172 and front fenders 174 are moved simultaneously with front fascia installation fixture 175. To couple hood 172 and front fenders 174 to frame 100, front fascia installation fixture 175 is advanced towards frame 100. Front fascia installation fixture 175 includes one or more hinge setting features 176 configured to retain hood hinges (not shown) on front fascia installation fixture 175. Front fascia installation fixture 175 further includes at least one alignment feature 178, which may include a pin, a post, a tab, a hook, and/or any other suitable alignment feature. Alignment feature 178 aligns with primary door datum 142 on frame 100 to align front fascia installation fixture 175 with respect to frame 100, thereby aligning the hood hinges in the B direction 103 with respect to frame 100. That is, alignment feature 178 aligns with the same primary door datum 142 on frame 100 used to align garnish installation fixture 135 and door installation fixture 165. Hinge setting features 176 may be adjusted in the T direction 101 to appropriately position the hood hinges in the T direction 101 with respect to frame 100. In one embodiment, front fascia installation fixture 175 includes a crowder mechanism 180 that facilitates simultaneous and complementary movement of the hood hinges (i.e., both move "inwards" in the B direction 103 by the same distance, or both move "outwards" in the B direction 103 by the same distance). The hood hinges are then secured in place appropriately aligned in both the T and B directions 101, 103.

Aligning alignment feature 178 with primary door datum 142 further aligns hood 172 and front fenders 174 in the B direction 103. Front fascia installation fixture 175 is configured to maintain B-direction alignment of hood 172 and front fenders 174 with respect to one another and to inhibit independent movement of hood 172 and/or front fenders 174. Front fascia installation fixture 175 is further configured to permit adjustment of hood 172 and front fenders 174 (simultaneously) in the T direction 101, to set an appropriate gap between hood 172 and windshield 124 and/or between front fenders 174 and door 160. In one embodiment, hood 172 and front fenders 174 may be adjusted via a screw mechanism. Once hood 172 and front fenders 174 are positioned appropriately in the T direction 101, hood 172 is coupled to frame 100 by attachment to the installed hood hinges (e.g., via bolts or any other attachment mechanism). In addition, front fenders 174 are coupled to frame 100 (e.g., via bolts or any other attachment mechanism).

In some embodiments, additional front body components 170 may be coupled to frame 100 during the fourth phase of assembly. For example, a hood lock (not shown) may be coupled to frame 100 to lock hood 172 in a closed position (shown in FIG. 17). Additionally or alternatively, some rear body components 190 may be coupled to frame 100 during the fourth phase of assembly. For example, a rear bumper and/or a trunk box 192 may be coupled to frame 100 using any suitable installation method during the fourth phase of assembly.

Figure 16:
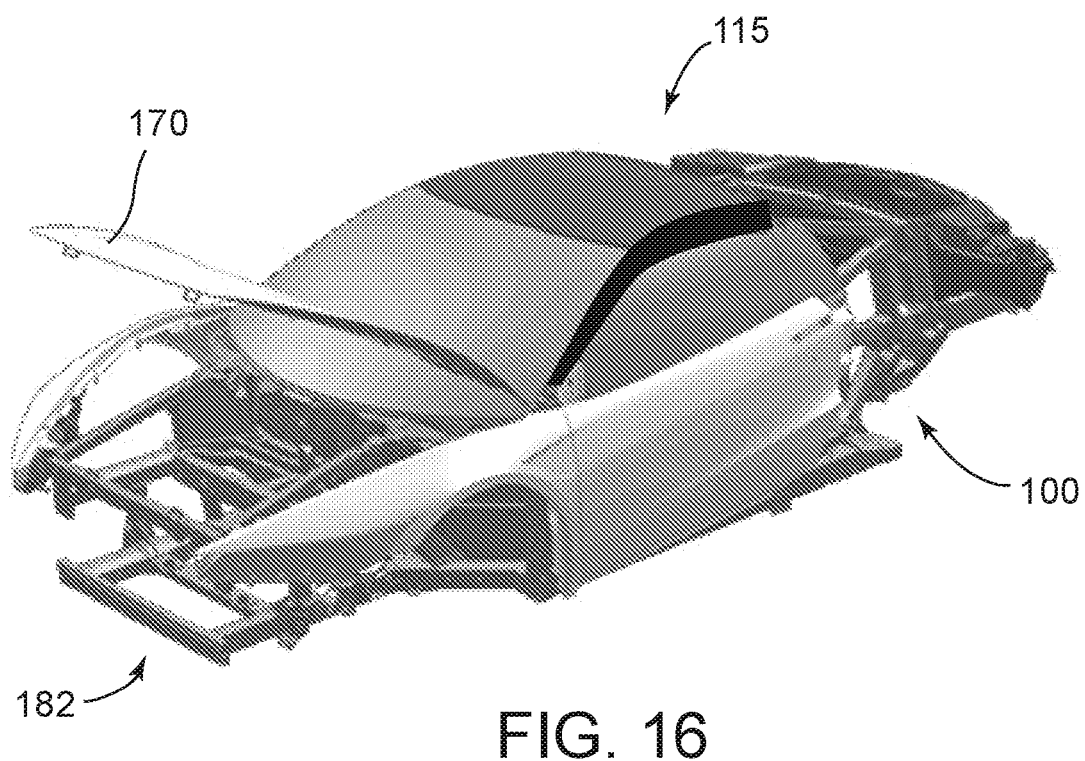
FIG. 16 is perspective view of the vehicle frame shown in FIG. 1 with an assembled front body of a vehicle installed thereon.
Figure 17:
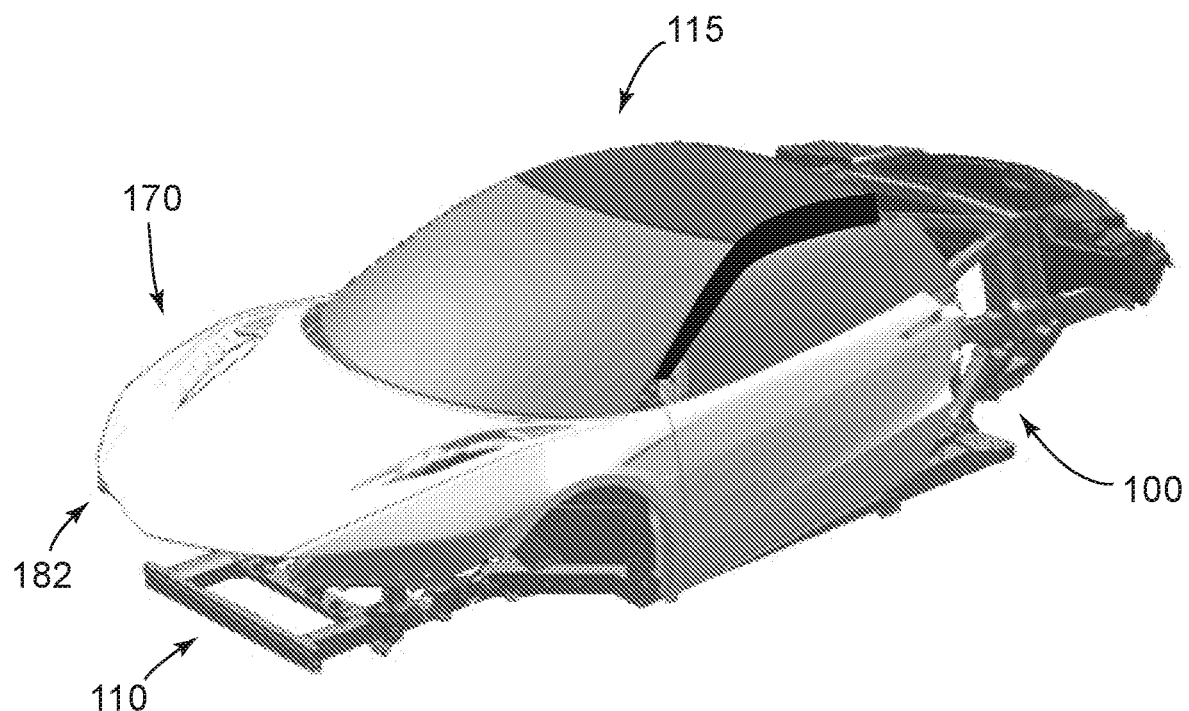
FIG. 17 is another perspective view of the vehicle frame shown in FIG. 1 with the assembled front body of the vehicle installed thereon.

FIGS. 16 and 17 illustrate a partially assembled state of vehicle 115, with an assembled front body 182 installed onto front portion 110 of frame 100.

Figure 18:
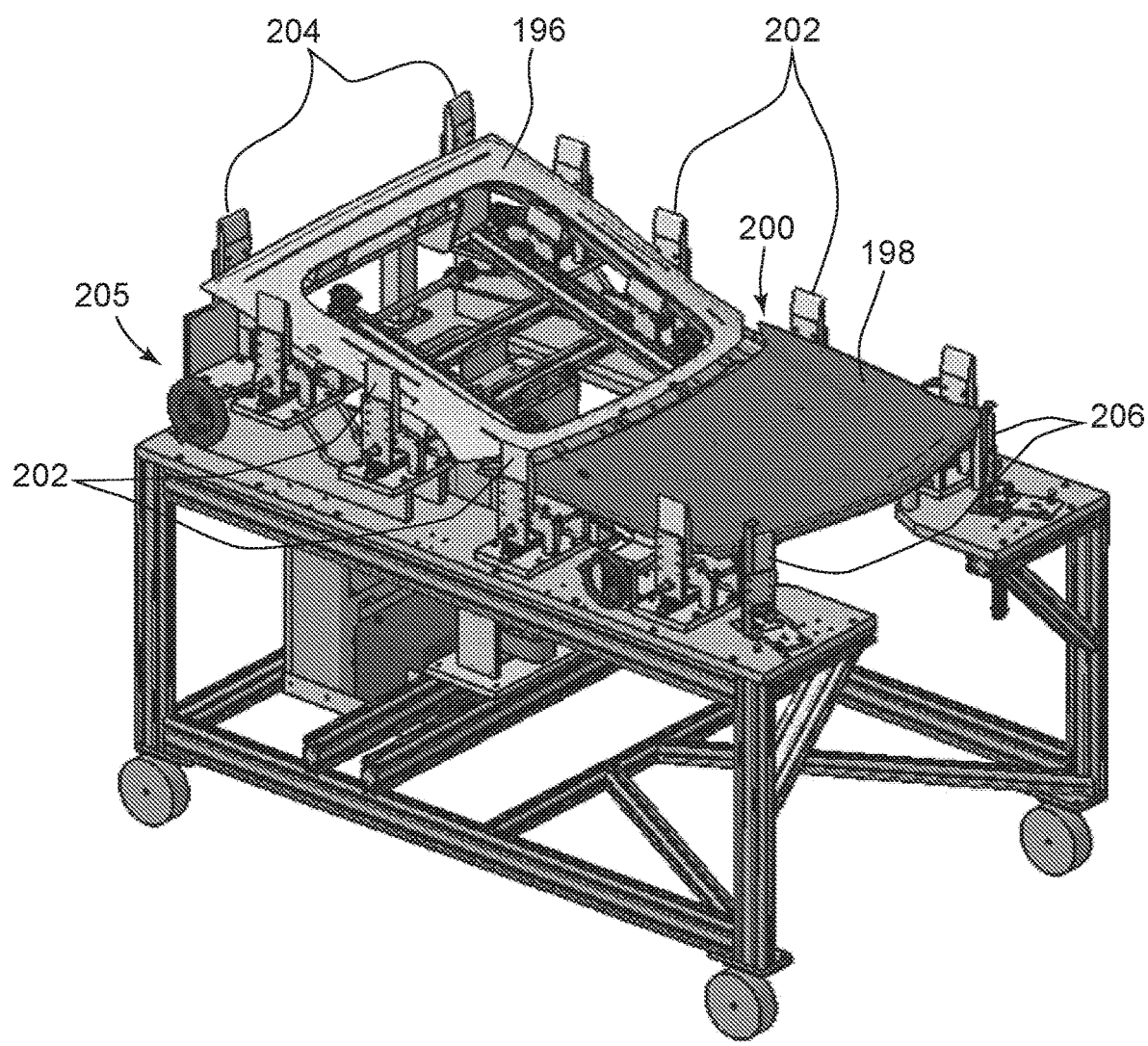
FIG. 18 is a perspective view of an assembling fixture for use in a fifth phase of vehicle assembly in which rear body components are coupled to the vehicle frame shown in FIG. 1.
Figure 19:
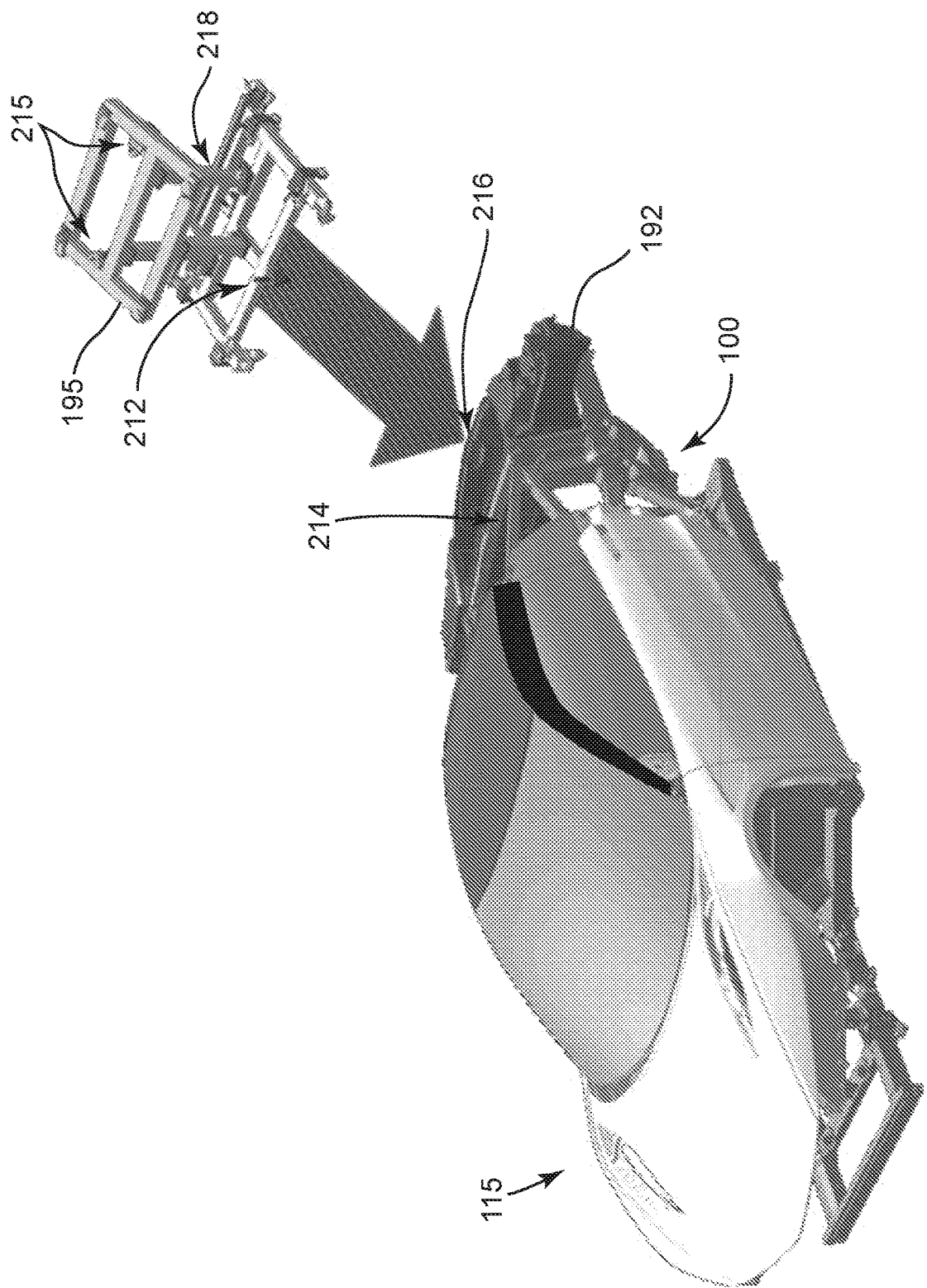
FIG. 19 is a perspective view of the vehicle frame shown in FIG. 1 during the fifth phase of vehicle assembly.
Figure 20:
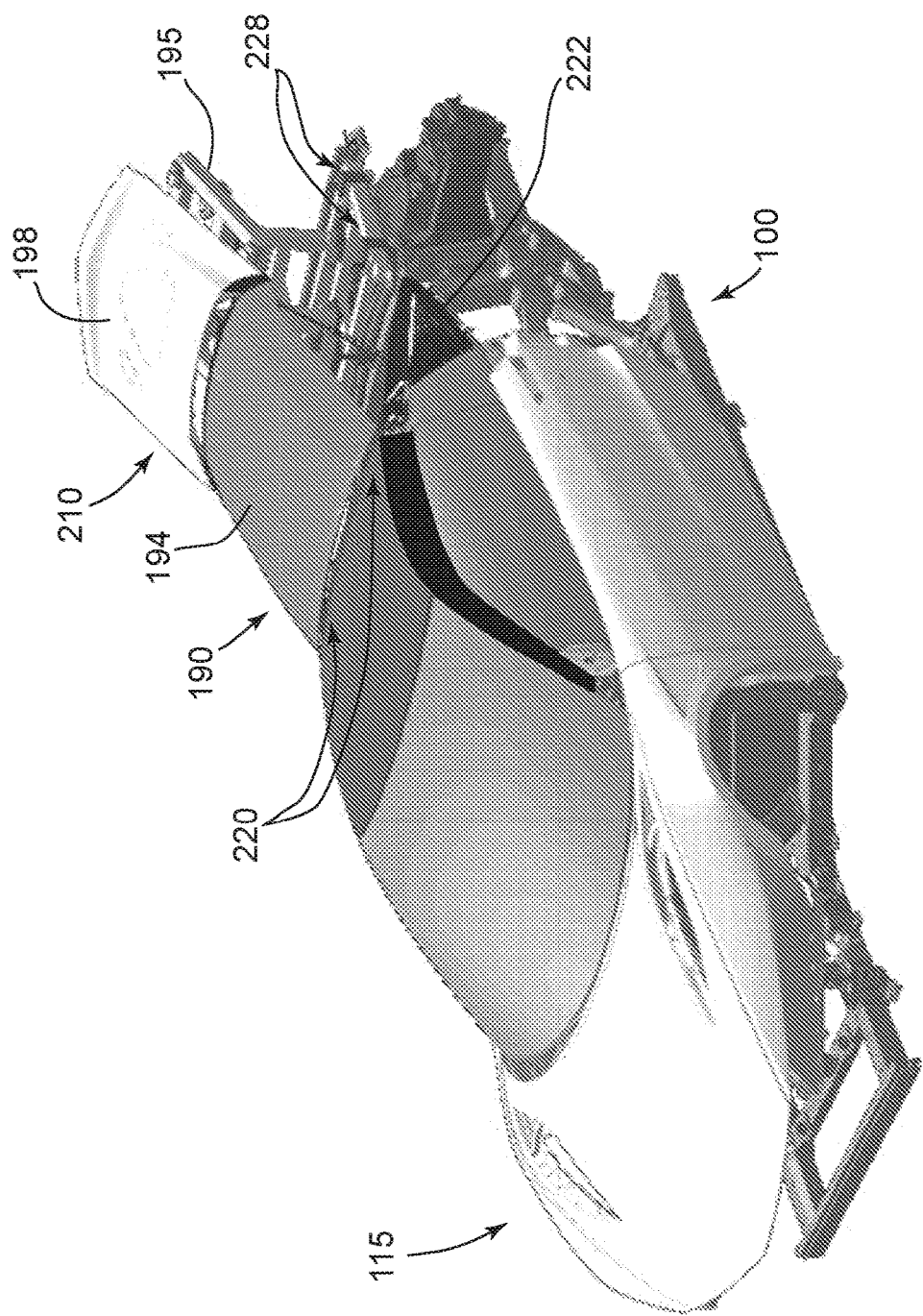
FIG. 20 is another perspective view of the vehicle frame shown in FIG. 1 during the fifth phase of vehicle assembly.

A fifth phase of assembly of vehicle 115 is illustrated in FIGS. 18-20. In the fifth phase, one or more rear body components 190 are coupled to frame 100 using at least one rear fascia installation fixture 195. In the exemplary embodiment, rear body components 190 include a rear windshield 194, a rear windshield frame 196 (see FIG. 18), and a trunk lid 198.

As shown in FIG. 18, rear windshield 194, rear windshield frame 196 and trunk lid 198 are initially aligned relative to one another and coupled together using an assembly fixture 205. Assembly fixture 205 is configured to position rear windshield frame 196 using one or more positioning data (not shown). Rear windshield 194 and trunk lid 198 are then aligned with respect to rear windshield frame 196. More specifically, assembly fixture 205 includes a plurality of centering crowders 202 configured to center rear windshield 194 and trunk lid 198, to align these components in the B direction 103 with respect to rear windshield frame 196. In addition, assembly fixture 205 includes one or more rear windshield positioning blocks 204 and one or more trunk lid positioning blocks 206 configured to adjust the position of rear windshield 194 and trunk lid 198, respectively, in the T direction 101 relative to rear windshield frame 196. Rear windshield 194 and trunk lid 198 may be positioned in the T direction 101 independently of one another, using positioning blocks 204, 206, to set a suitable gap 200 between rear windshield 194 and trunk lid 198. Rear windshield 194 and trunk lid 198 are coupled to rear windshield frame 196 when appropriately aligned. In the example embodiment, rear windshield 194 and trunk lid 198 are coupled to rear windshield frame 196 using a bonding agent, although in alternative embodiments, rear windshield 194 and/or trunk lid 198 may be otherwise coupled to rear windshield frame 196 (e.g., using bolts, pins, screws, clamps, clips, and/or any other installation method). Although rear windshield 194 is not shown in FIG. 18, rear windshield 194 is illustrated in the appropriately aligned position on rear windshield frame 196 in FIG. 20. Rear windshield 194, rear windshield frame 196, and trunk lid 198 may be collectively referred to as a "rear body component assembly 210".

With reference to FIGS. 19 and 20, rear fascia installation fixture 195 includes at least one alignment feature 212, which may include a pin, post, tab, hook, and/or any other suitable alignment feature. Alignment feature 212 aligns with a primary rear datum 214 on frame 100. Primary rear datum 214 is an opening defined in rear surface 106 of frame 100. Primary rear datum 214 is positioned and/or configured specifically for the alignment functions described herein. Aligning alignment feature 212 with primary rear datum 214 aligns rear fascia installation fixture 195 in the T direction 101 and the B direction 103 with respect to frame 100. Rear body component assembly 210 is coupled to rear fascia installation fixture 195 to facilitate alignment of rear body component assembly 210 in the T and B directions 101, 103 with respect to frame 100. Rear fascia installation fixture 195 may include one or more fixture data 215 for aligning rear body component assembly 210 with rear fascia installation fixture 195. Rear body component assembly 210 may be additionally or alternatively adjusted in the B direction 103 to align rear body component assembly 210 with respect to at least one secondary rear datum 216 on trunk box 192 and/or a striker plate (not shown) to ensure trunk lid 198 will properly close and be secured in a closed position. In the illustrated embodiment, rear fascia installation fixture 195 includes at least one secondary alignment feature 218, which may include a pin, post, tab, hook, and/or any other suitable alignment feature. Secondary alignment feature 218 is configured to align with secondary rear datum 216 to align rear fascia installation fixture 195 (and, therefore, rear body component assembly 210) in the B direction 103 and the H direction 105. Once rear body component assembly 210 is positioned and aligned in the T, B, and H directions 101, 103, 105, rear body component assembly 210 (e.g., rear windshield frame 196) is coupled to frame 100 at one or more hinge mount locations 220.

In some embodiments, trunk box 192 may be installed during the fifth phase of assembly and/or trunk box 192, if already preliminarily installed, may be aligned in the T direction 101 and aligned with trunk lid 198 to ensure proper alignment of these two rear body components. Additionally or alternatively, one or more other rear body components 190 may be coupled to frame 100. For example, a trunk frame, trunk frame hinges, and/or a trunk striker (not shown) may be coupled to frame 100 during the fifth phase of assembly. Moreover, one or more side rear panels 222 may be coupled to frame 100 during the fifth phase of assembly.

Figure 21:
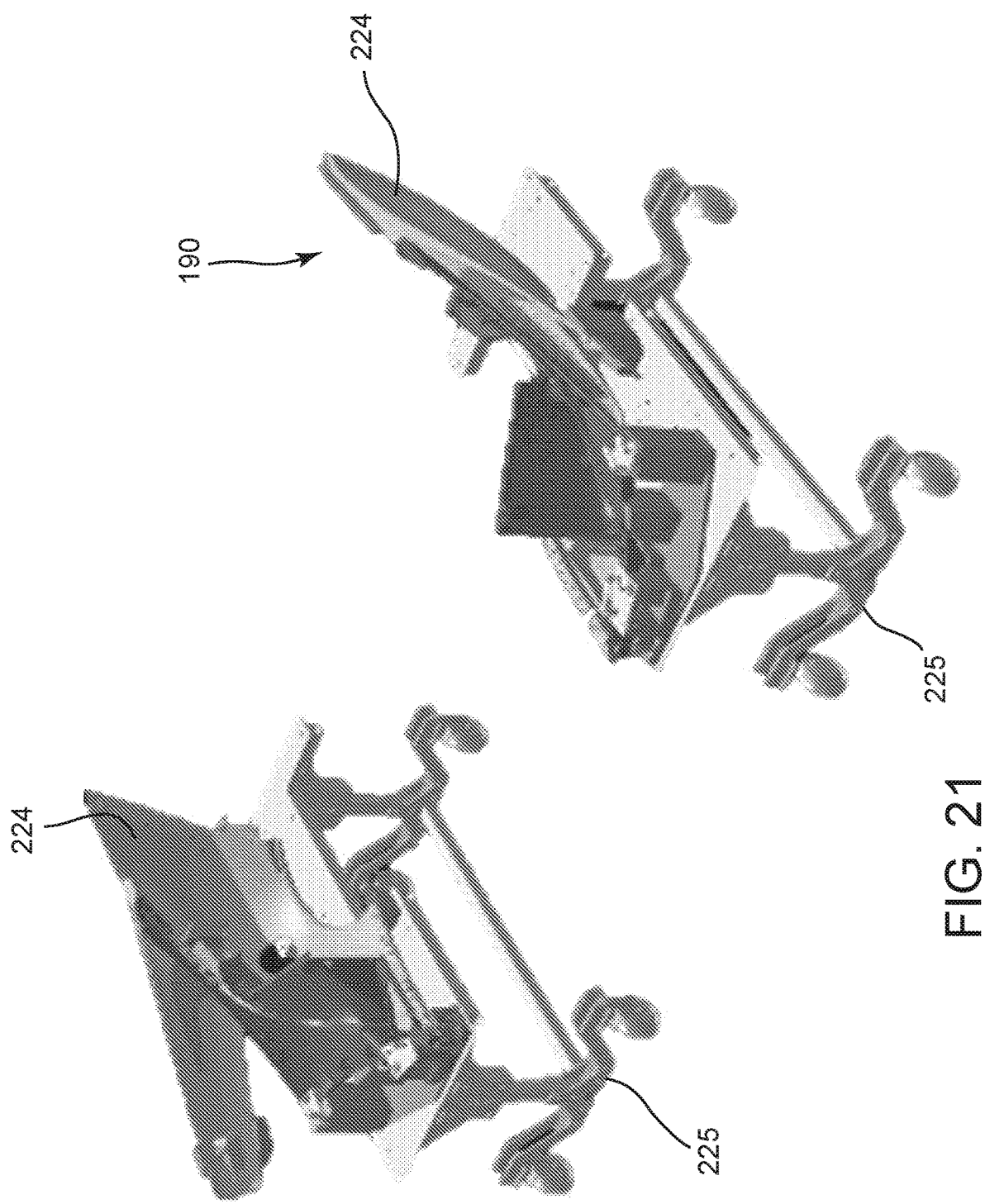
FIG. 21 is a perspective view of rear fender installation fixtures for use in a sixth phase of vehicle assembly in which rear body components are coupled to the vehicle frame shown in FIG. 1.
Figure 22:
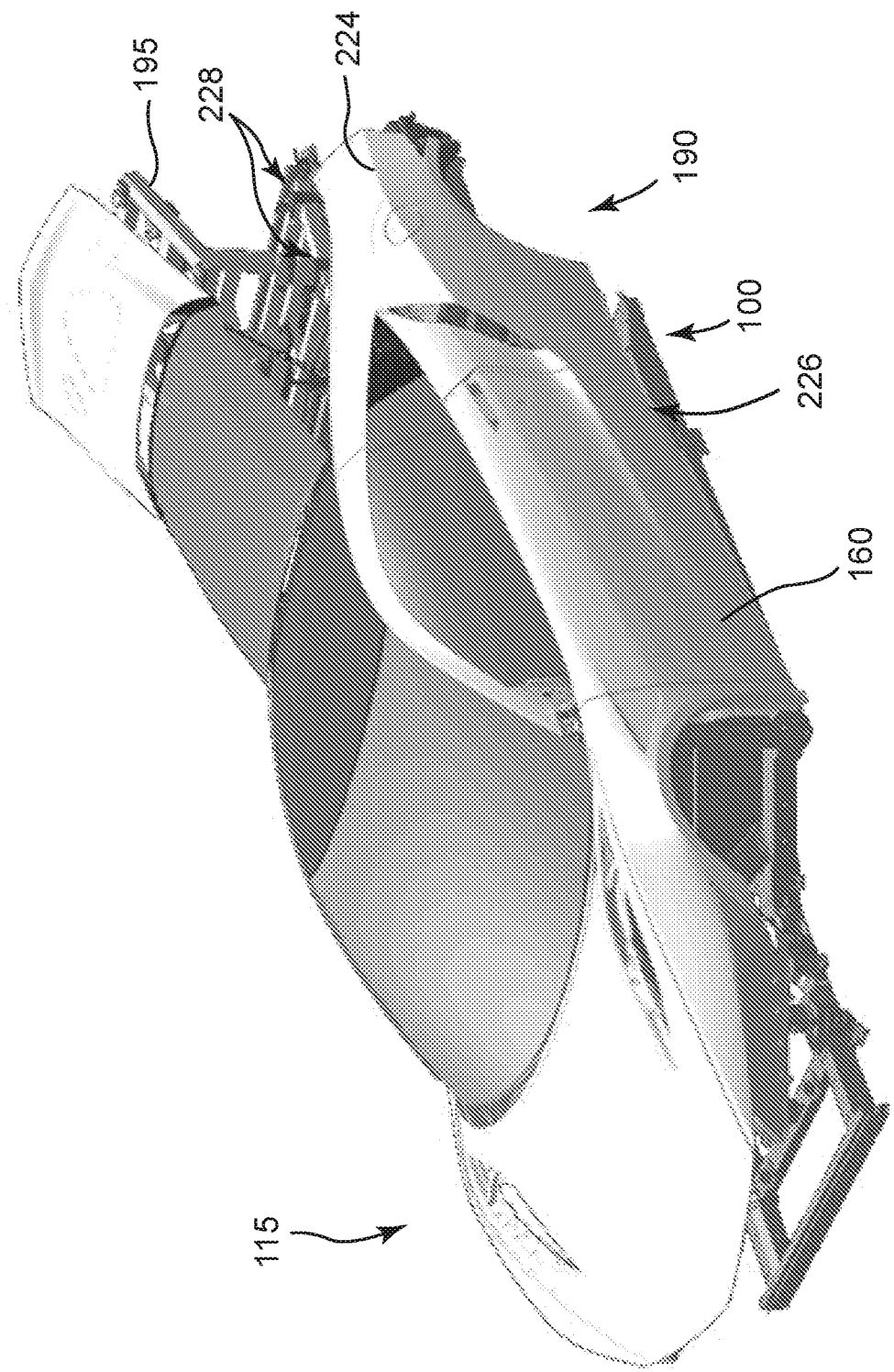
FIG. 22 is a perspective view of the vehicle frame shown in FIG. 1 during the sixth phase of vehicle assembly.
Figure 23:
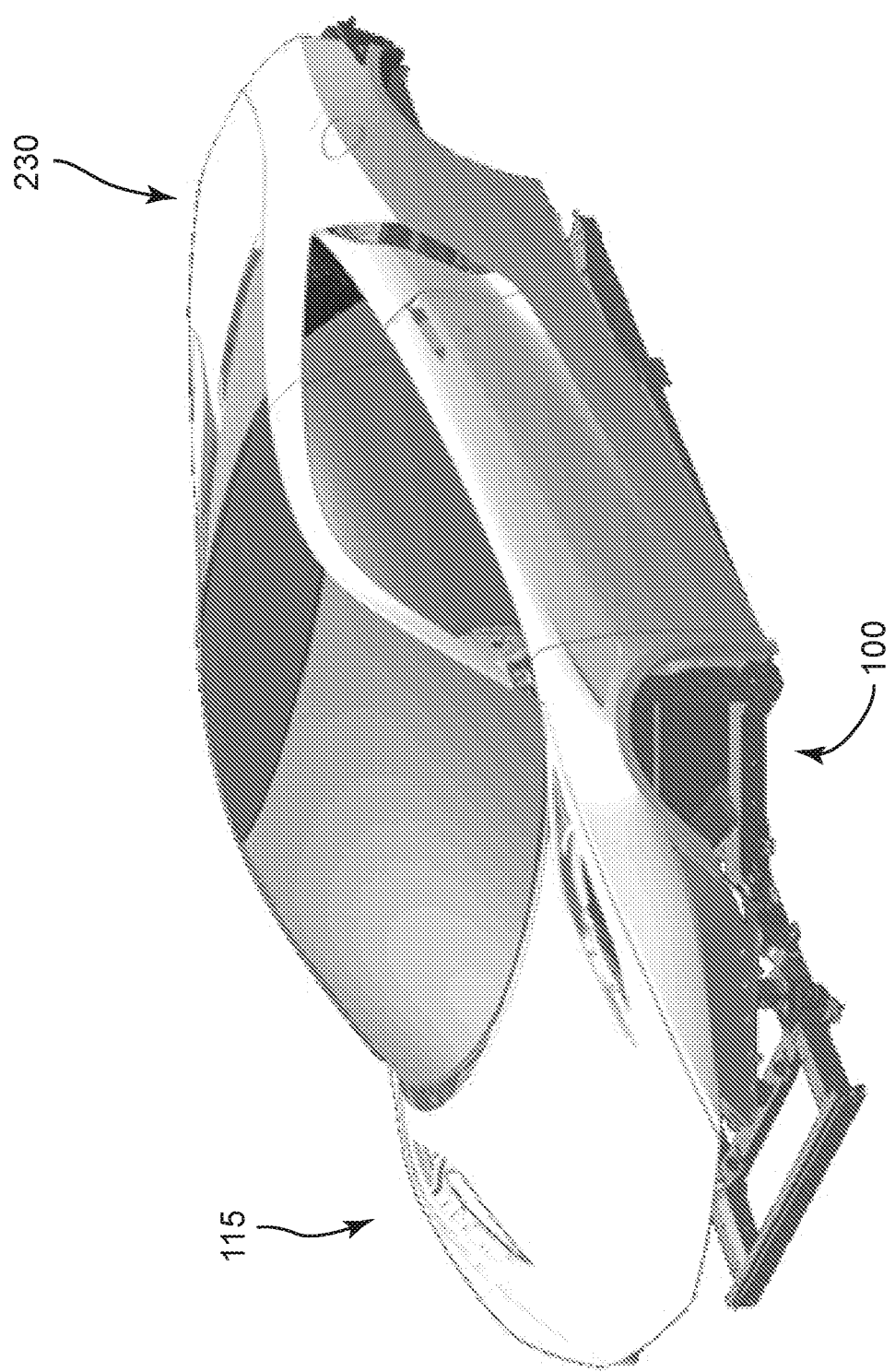
FIG. 23 is another perspective view of the vehicle frame shown in FIG. 1 during the sixth phase of vehicle assembly.

A sixth phase of assembly of vehicle 115 is illustrated in FIGS. 21-23. In the sixth phase, one or more rear body components 190 are coupled to frame 100 using at least one rear fender installation fixture 225. In the exemplary embodiment, rear body components 190 that are coupled to frame 100 during the sixth phase of assembly may include rear fenders 224.

In the illustrated embodiment, rear fenders 224 are coupled to respective rear fender installation fixtures 225. Rear fender installation fixtures 225 are advanced towards frame 100 to install rear fenders 224 onto frame 100. Rear fender installation fixtures 225 are, in the illustrated embodiment, maneuverable in the T direction 101 and the B direction 103. Rear fender installation fixtures 225 may have one or more alignment features (not shown) and/or height adjustment features (not shown) to adjust the position of rear fenders 224 in the T and H directions 101, 105 with respect to frame 100. The position of each rear fender 224 is set in the B direction 103 (e.g., flush with frame 100 and/or aligned with trunk box 192 and/or trunk lid 198). In addition, the position of each rear fender 224 is adjusted in the T direction 101 to set a suitable gap 226 between rear fender 224 and door 160. More specifically, in the illustrated embodiment, rear fascia installation fixture 195 includes one or more rear fender positioning features 228 (shown in FIGS. 20 and 22) configured to enable suitable positioning of each rear fender 224 with respect to a corresponding door 160. Rear fender positioning features 228 interact with one or more corresponding features (not shown) on rear fender 224 to ensure suitable alignment of rear fenders 224 in the T direction 101.

FIG. 23 illustrates a partially assembled state of vehicle 115, with an assembled rear body 230 installed onto rear portion 114 of frame 100.

Although the fourth, fifth, and sixth phases of assembly have been described as occurring in a particular order, such order is illustrative only. For example, in some embodiments, the "fifth" and "sixth" phases described herein may occur prior to the "third" phase (e.g., rear body components 190 may be installed prior to front body components 170).

Figure 24:
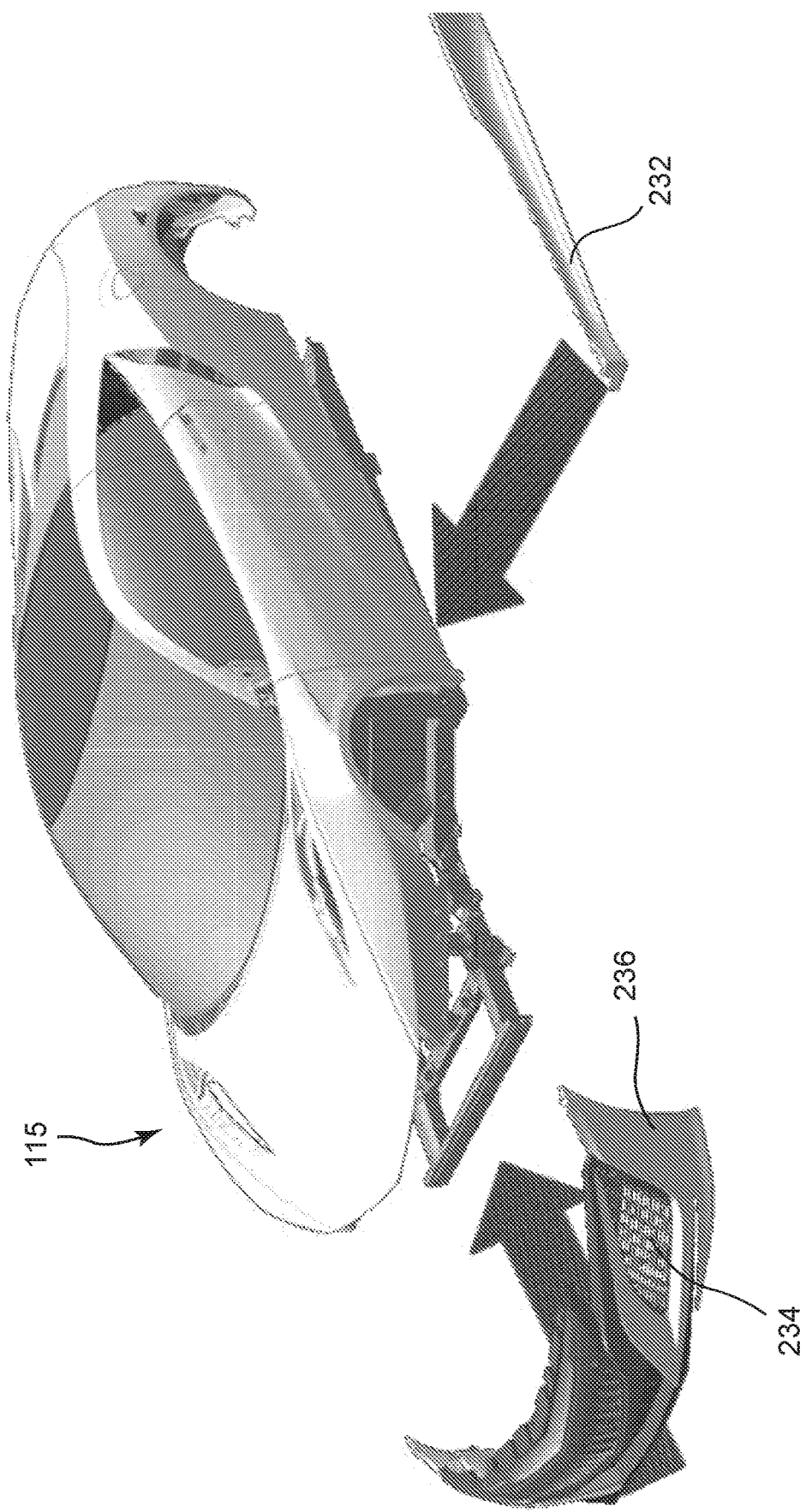
FIG. 24 is a perspective view of the vehicle frame shown in FIG. 1 during an additional phase of vehicle assembly in which additional body components are coupled to the vehicle frame shown in FIG. 1.

FIG. 24 illustrates an additional phase of assembly in which one or more additional body components may be installed. For example, rear fender garnishes 232, intake mesh 234, an intake garnish 236, and/or a fuel lid and adapter (not shown) may be installed during this phase of assembly.

Figure 25:
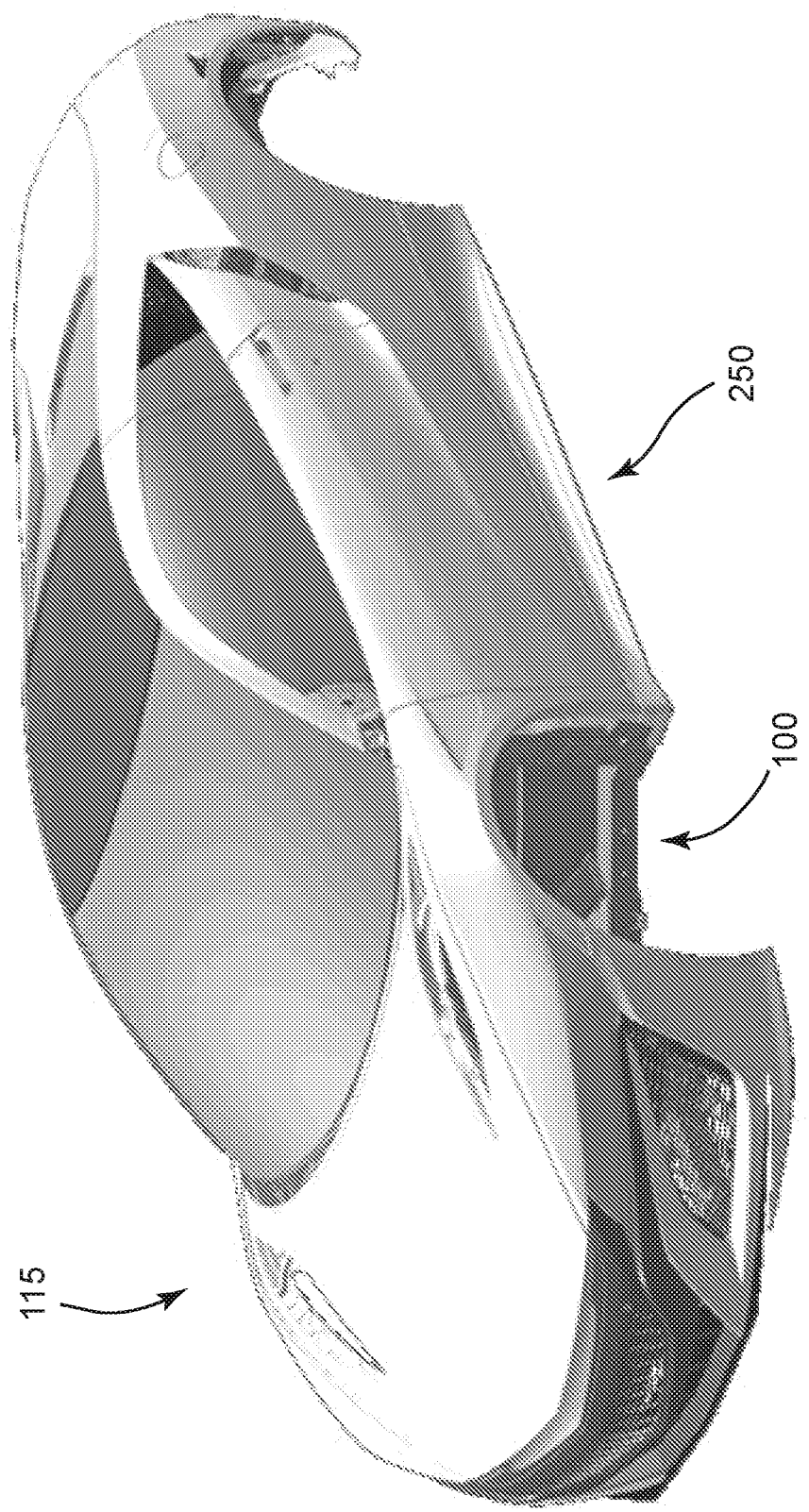
FIG. 25 is a perspective view of an assembled vehicle with body components fully installed onto the vehicle frame shown in FIG. 1.

FIG. 25 illustrates a partially assembled state of the vehicle, with a fully assembled body 250 installed onto frame 100.

The systems and methods described above facilitate more precise and consistent vehicle assembly. The center body of the vehicle is assembled first, by installing a plurality of center body components onto a vehicle frame prior to assembly of a front or rear body of the vehicle. The front body and rear body are assembled after assembly of the center body, by installing a plurality of front body and rear body components onto the vehicle frame. Moreover, one or more alignment data are provided on the vehicle frame to improve alignment of body components with respect to the vehicle frame and to other body components. A plurality of installation fixtures are provided, the installation fixtures including alignment features that enable alignment of the installation fixtures (and, thereby, the body components)

with respect to the vehicle frame. The systems and methods enable overall reduction in tolerance stack, over the full length of the vehicle. Starting installation of body components at the center and proceeding outwards (e.g., forwards to install front body components or rearwards to install rear body components) prevents the tolerance stack or variation from being isolated to one end of the vehicle (e.g., the front or the rear), which exacerbates tolerance stack issues. Moreover, the systems and methods facilitate improving system function of the assembled vehicle (e.g., reduced door closing force, reduced water leakage, and/or improved wind noise performance), prior to setting a fit and finish of other exterior components. Fit and finish are controlled by component edges and surfaces, which are seen by users of the vehicle, instead of a general body datum scheme, which reduces a welded body impact on the exterior body panel fit and finish.

Exemplary embodiments of vehicle assembly systems and methods are described above in detail. The systems and methods are not limited to the specific embodiments described herein, but rather, components of the systems and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited feature.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a vehicle including a vehicle frame, said method comprising:
   aligning a first installation fixture with the vehicle frame, wherein the first installation fixture includes a roof panel and a windshield connected thereto;
   coupling the roof panel and the windshield to the vehicle frame;
   aligning a second installation fixture with a door datum included on the vehicle frame, wherein the second installation fixture includes a center body component connected thereto;
   coupling the center body component to the vehicle frame;
   aligning, subsequent to the roof panel, the windshield, and the center body component being coupled to the vehicle frame, a third installation fixture with the door datum, wherein the third installation fixture includes a front body component connected thereto;
   coupling the front body component to the vehicle frame;
   aligning, subsequent to the roof panel, the windshield, and the center body component being coupled to the vehicle frame, a fourth installation fixture with the vehicle frame, wherein the fourth installation fixture includes a rear body component connected thereto; and
   coupling the rear body component to the vehicle frame.

2. The method of claim 1, wherein coupling the center body component to the vehicle frame comprises coupling a door ring garnish to the vehicle frame.

3. The method of claim 1, wherein coupling the center body component to the vehicle frame comprises coupling a door to the vehicle frame.

4. The method of claim 1, wherein the center body component is a first center body component, said method further comprising:
   aligning, subsequent to the first center body component being coupled to the vehicle frame, a fifth installation fixture with the door datum, wherein the fifth installation fixture includes a second center body component connected thereto; and
   coupling the second center body component to the vehicle frame.

5. The method of claim 4, wherein coupling the first center body component to the vehicle frame comprises coupling a door ring garnish to the vehicle frame, and wherein coupling the second center body component to the vehicle frame comprises coupling a door to the vehicle frame.

6. The method of claim 1 further comprising coupling the windshield to the first installation fixture, wherein said coupling comprises:
   aligning the windshield with the roof panel in a first direction while the roof panel is connected to the first installation fixture; and
   adjusting a position of the windshield in a second direction different from the first direction to set a gap between the windshield and the roof panel.

7. The method of claim 1, wherein coupling the front body component to the vehicle frame comprises coupling a hood to the vehicle frame.

8. The method of claim 1, wherein the front body component is a first front body component, and wherein a second front body component and a third front body component are connected to the second installation fixture, said method further comprising:
   maintaining alignment of the first, second, and third front body components in a first direction;
   adjusting a position of the first, second, and third front body components in a second direction different from the first direction; and
   coupling the first, second, and third front body components to the vehicle frame after said adjusting.

9. The method of claim 1 further comprising assembling the rear body component from at least two rear body sub-components.

10. The method of claim 1, wherein the rear body component is a first rear body component, said method further comprising:
    coupling a second rear body component to a fifth installation fixture;
    aligning the second rear body component with the center body component to set a desired gap between the center body component and the second rear body component; and
    coupling the second rear body component onto the vehicle frame.

11. The method of claim 1, wherein the vehicle frame further includes a rear datum, said method further comprising, aligning the fourth installation fixture with the rear datum to align the rear body component with the vehicle frame.

12. A method of assembling a vehicle including a vehicle frame, said method comprising:
- assembling a center body of the vehicle by aligning a plurality of center body components with the vehicle frame and coupling the plurality of center body components to the vehicle frame, wherein assembling the center body of the vehicle includes aligning a first installation fixture with the vehicle frame, the first installation fixture including a first center body component of the plurality of center body components connected thereto; and
- subsequent to assembling the center body, assembling at least one of a front body and a rear body of the vehicle, wherein assembling the front body of the vehicle comprises coupling a plurality of front body components to the vehicle frame, and wherein assembling the rear body of the vehicle comprises coupling a plurality of rear body components to the vehicle frame.

13. The method of claim 12, wherein assembling a center body of the vehicle comprises:
- aligning the first installation fixture with a door datum included on the vehicle frame; and
- coupling the first center body component to the vehicle frame.

14. The method of claim 13, wherein coupling the first center body component to the vehicle frame comprises coupling one of a door ring garnish and a door to the vehicle frame.

15. The method of claim 13, further comprising:
- aligning, subsequent to the first center body component being coupled to the vehicle frame, a second installation fixture with the door datum, wherein the second installation fixture includes a second center body component of the plurality of center body components connected thereto; and
- coupling the second center body component to the vehicle frame.

16. The method of claim 15, wherein coupling the first center body component to the vehicle frame comprises coupling a door ring garnish to the vehicle frame, and wherein coupling the second center body component to the vehicle frame comprises coupling a door to the vehicle frame.

17. The method of claim 13, wherein coupling a plurality of front body components to the vehicle frame comprises:
- aligning a third installation fixture with a door datum of the vehicle frame, wherein the third installation fixture includes a first front body component of the plurality of front body components connected thereto; and
- coupling the first front body component to the vehicle frame.

18. The method of claim 17, wherein a second front body component and a third front body component of the plurality of front body components are connected to the third installation fixture, said method further comprising:
- maintaining alignment of the first, second, and third front body components in a first direction;
- adjusting a position of the first, second, and third front body components in a second direction different from the first direction; and
- coupling the first, second, and third front body components to the vehicle frame after said adjusting.

19. The method of claim 13, wherein coupling a plurality of rear body components to the vehicle frame comprises:
- aligning a fourth installation fixture with the vehicle frame, wherein the fourth installation fixture includes a first rear body component of the plurality of rear body components connected thereto; and
- coupling the first rear body component to the vehicle frame.

20. The method of claim 19, wherein the vehicle frame includes a rear datum, said method further comprising aligning the fourth installation fixture with the rear datum to align the first rear body component with the vehicle frame.

* * * * *